(12) United States Patent
Aoki et al.

(10) Patent No.: US 11,830,409 B2
(45) Date of Patent: Nov. 28, 2023

(54) PERIPHERAL IMAGE DISPLAY DEVICE

(71) Applicants: DENSO CORPORATION, Kariya (JP); TOYOTA JIDOSHA KABUSHIKI KAISHA, Toyota (JP)

(72) Inventors: Shinya Aoki, Kariya (JP); Yoshitsugu Yamashita, Kariya (JP); Akira Sugie, Kariya (JP); Tomoki Miyata, Toyota (JP); Jun Kamishima, Toyota (JP); Yamato Yorifuji, Togo-cho (JP); Kohei Maejima, Nagakute (JP)

(73) Assignees: DENSO CORPORATION, Aichi-pref. (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 101 days.

(21) Appl. No.: 17/650,999

(22) Filed: Feb. 14, 2022

(65) Prior Publication Data
US 2022/0262297 A1  Aug. 18, 2022

(30) Foreign Application Priority Data
Feb. 17, 2021 (JP) ................ 2021-023678

(51) Int. Cl.
*G09G 3/20* (2006.01)
*G07C 5/08* (2006.01)
*G06T 11/00* (2006.01)

(52) U.S. Cl.
CPC .......... *G09G 3/2092* (2013.01); *G06T 11/00* (2013.01); *G07C 5/0825* (2013.01); *G09G 2340/02* (2013.01); *G09G 2380/10* (2013.01)

(58) Field of Classification Search
None
See application file for complete search history.

(56) References Cited

U.S. PATENT DOCUMENTS

| | | | |
|---|---|---|---|
| 2012/0158256 A1* | 6/2012 | Kuboyama | B62D 15/0275 701/1 |
| 2016/0001704 A1* | 1/2016 | Nakasho | B60R 1/00 701/36 |
| 2016/0009225 A1* | 1/2016 | Watanabe | H04N 7/181 348/148 |
| 2018/0004222 A1 | 1/2018 | Maruoka et al. | |

(Continued)

FOREIGN PATENT DOCUMENTS

| | | |
|---|---|---|
| DE | 102014204872 A1 | 9/2015 |
| JP | 2006-088828 A | 4/2006 |
| JP | 2019-014397 A | 1/2019 |

*Primary Examiner* — David H Chu
(74) *Attorney, Agent, or Firm* — MASCHOFF BRENNAN

(57) ABSTRACT

A peripheral image display device is configured to: acquire wheel speeds of a vehicle; determine a slip state or a non-slip state of a wheel of the vehicle based on the acquired wheel speeds; acquire multiple camera images from respective cameras; store, as a past image, the camera image indicating a range in a traveling direction of the vehicle; generate a peripheral image indicating a periphery of the vehicle by synthesizing the camera images, display the peripheral image on a display. In the non-slip state, the peripheral image display device displays a transparent image showing, in a transparent manner, a portion under a floor of the vehicle using the past image selected based on current wheel speeds is. In the slip state, the peripheral image display device deactivates the display of the transparent image.

9 Claims, 11 Drawing Sheets

(56) References Cited

U.S. PATENT DOCUMENTS

| | | | |
|---|---|---|---|
| 2018/0089907 A1* | 3/2018 | Maruoka | G06T 17/05 |
| 2018/0192005 A1 | 7/2018 | Watanabe et al. | |
| 2018/0201191 A1 | 7/2018 | Nakasho et al. | |
| 2019/0232874 A1 | 8/2019 | Watanabe | |
| 2020/0169662 A1* | 5/2020 | Watanabe | H04N 23/63 |
| 2020/0193183 A1* | 6/2020 | Watanabe | B60R 11/04 |
| 2022/0072954 A1* | 3/2022 | Prabhakar | B60K 35/00 |

* cited by examiner

PERIPHERAL IMAGE DISPLAY DEVICE

CROSS REFERENCE TO RELATED APPLICATION

The present application claims the benefit of priority from Japanese Patent Application No. 2021-023678 filed on Feb. 17, 2021. The entire disclosure of the above application is incorporated herein by reference.

TECHNICAL FIELD

The present disclosure relates to a peripheral image display device.

BACKGROUND

Conventionally, a peripheral monitoring device that displays an underfloor situation on a display device is known.

SUMMARY

The present disclosure provides a peripheral image display device that is configured to: acquire wheel speeds of a vehicle; determine a slip state or a non-slip state of a wheel of the vehicle based on the acquired wheel speeds; acquire multiple camera images from respective cameras; store, as a past image, the camera image indicating a range in a traveling direction of the vehicle; generate a peripheral image indicating a periphery of the vehicle by synthesizing the camera images, display the peripheral image on a display. In the non-slip state, the peripheral image display device displays a transparent image showing, in a transparent manner, a portion under a floor of the vehicle using the past image selected based on current wheel speeds is. In the slip state, the peripheral image display device deactivates the display of the transparent image.

BRIEF DESCRIPTION OF DRAWINGS

The above and other objects, features and advantages of the present disclosure will become more apparent from the following detailed description made with reference to the accompanying drawings. In the drawings.

DETAILED DESCRIPTION

Figure 1:
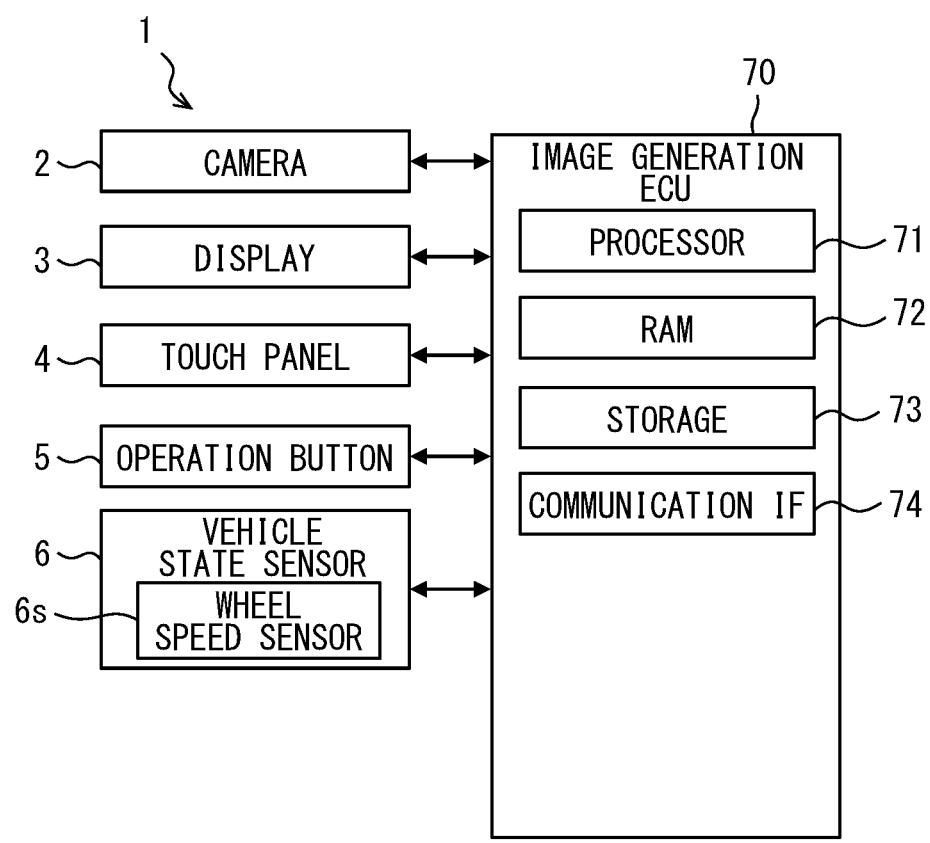
FIG. 1 is a block diagram showing a configuration of a peripheral image display system.

Japanese Unexamined Patent Publication No. 2016-21653 discloses a peripheral monitoring device that displays an underfloor situation of a vehicle on a display device. The underfloor region is a blind spot in the vicinity of the vehicle. The disclosure of this document is incorporated herein by reference.

In the structure of above-described document, the movement amount and position of the vehicle are estimated based on information such as optical flow, wheel speed, GPS, etc., and the past image is displayed as an underfloor image. However, image processing such as optical flow requires a large processing load, and this may take time to estimate the movement amount of the vehicle. Further, when the movement amount is estimated based on the wheel speed, if the wheel is in a slip state, the estimated movement amount may be significantly different from the actual movement amount. When an erroneous image is displayed as the underfloor image, the user may misunderstand the situation under the vehicle floor, and a reliability of the peripheral image may decrease. For this reason and other reasons that are not described, further improvement is required to be made in a peripheral image display device.

One object of the present disclosure is to provide a peripheral image display device having a high reliability.

According to an aspect of the present disclosure, a peripheral image display device includes: a wheel speed acquisition unit acquiring wheel speeds of a vehicle; a wheel slip determination unit determining a slip state or a non-slip state of a wheel of the vehicle based on the wheel speeds acquired by the wheel speed acquisition unit; an image acquisition unit acquiring multiple camera images from respective cameras, each of the cameras successively capturing a peripheral range of the vehicle; an image storage storing, as a past image, the camera image indicating a range in a traveling direction of the vehicle among the camera images acquired by the image acquisition unit; a composite image generation unit generating a peripheral image indicating a periphery of the vehicle by synthesizing the camera images acquired by the image acquisition unit; and a display control unit displaying the peripheral image generated by the composite image generation unit on a display. In the non-slip state, the display control unit displays a transparent image showing, in a transparent manner, a portion under a floor of the vehicle using the past image selected based on current wheel speeds. In the slip state, the display control unit deactivates a display of the transparent image, which shows the portion under the floor of the vehicle using the past image selected based on the current wheel speeds.

According to the above peripheral image display device, in the non-slip state, the display control unit displays the transparent image showing, in a transparent manner, the portion under the floor of the vehicle using the past image selected based on current wheel speeds. In the slip state, the display control unit does not display the transparent image showing the portion under the floor of the vehicle using the past image selected based on the current wheel speeds. Thus, in the slip state, it is possible to prevent the user from misunderstanding an underfloor situation by displaying an erroneous image as the underfloor image. Therefore, it is possible to provide a peripheral image display device having a high reliability.

The disclosed aspects in this specification adopt different technical solutions from each other in order to achieve their respective objectives. The objects, features, and advantages disclosed in this specification will become apparent by referring to following detailed descriptions and accompanying drawings.

Embodiments will be described with reference to drawings. In some embodiments, functionally and/or structurally corresponding and/or associated parts may be given the same reference numerals, or reference numerals with different digit placed on equal to or higher than a hundred place. For corresponding parts and/or associated parts, reference can be made to the description of other embodiments.

First Embodiment

In FIG. 1, a peripheral image display system 1 displays, on a display 3, a peripheral image that indicates a periphery of a subject vehicle 9 on which the system is mounted. The periphery of the vehicle 9 may include positions around the vehicle 9 in various directions such as front, rear, side, and downward. The peripheral image may include image in partial directions instead of the entire surrounding of the vehicle 9. For example, the peripheral image may include an image showing only the front direction or only the rear direction of the vehicle. In the following description, the vehicle 9 equipped with the peripheral image display system 1 is also referred to as an own vehicle.

For example, the own vehicle is a four-wheel vehicle with driving power source, and is supposed to travel not only on a road having road surface paved with asphalt but also on an unpaved road. As driving modes, the own vehicle has a normal mode and an off-road mode. The driving mode suitable for travelling on the paved road is set as the normal mode. The driving mode suitable for travelling on the unpaved road is set as the off-road mode. The distribution control method of driving force to the front, rear, left and right wheels in the normal mode is different from that of the off-road mode. As well known, the off-road indicates a ground surface having larger concavities and convexities, such as a rocky road. The off-road may also be understood as ground other than on-road, that is, the ground without maintenance. The present disclosure can also be applied to a vehicle which is not expected to travel on the off-road. The own vehicle may be a gasoline-powered vehicle with an engine as a driving source device, or may be an electric vehicle or a hybrid vehicle with a motor as the driving source device.

In the following explanation, a front-rear direction, a left-right direction, and an up-down direction are defined with reference to the own vehicle. Specifically, the front-rear direction corresponds to a longitudinal direction of the own vehicle. The left-right direction corresponds to a width direction of the own vehicle. The up-down direction corresponds to a height direction of the own vehicle. From another point of view, the up-down direction corresponds to a direction perpendicular to a plane parallel to both of the front-rear direction and the left-right direction. In the present disclosure, the plane perpendicular to the height direction of the own vehicle is also referred to as a vehicle horizontal plane. The direction perpendicular to the height direction of the own vehicle is also referred to as a vehicle horizontal direction, and the vehicle horizontal direction includes the front-rear direction and the left-right direction.

The parallel state in the present disclosure is not limited to a completely parallel state. A state of being angled within 20 degrees from a completely parallel state may be regarded as the parallel state. That is, the parallel state may include a substantially parallel state with inclination angle of 20 degrees or less. Similarly, a perpendicular state in the present disclosure is not limited to a completely perpendicular state.

The peripheral image display system 1 includes an image generation ECU 70, one or more cameras 2, a display 3, a touch panel 4, an operation button 5, and a vehicle state sensor 6. In the present disclosure, the ECU is used as an abbreviation for electronic control unit, and indicates any kind of electronic control device.

The image generation ECU 70 is communicably connected to each camera 2, the display 3, the touch panel 4, the operation button 5, and the vehicle state sensor 6. Each of the above-mentioned devices and the image generation ECU 70 may be individually connected by a dedicated line, or may be connected via a communication network equipped in the vehicle. For example, the camera 2 and the image generation ECU 70 may be directly connected by a dedicated video signal line.

The image generation ECU 70 generates a composite image of the surrounding of the vehicle from an arbitrary viewpoint based on the image data captured by each camera 2. The image generation ECU 70 displays the generated composite image on the display 3. The image generation ECU 70 can support the driving operation of the vehicle 9 by generating and displaying the composite image. The image generation ECU 70 is provided by a computer. The image generation ECU 70 includes a processor 71, a RAM 72, a storage 73, a communication interface (IF) 74, a bus line connecting these components. The image generation ECU 70 corresponds to an example of the peripheral image display device of the present disclosure.

The processor 71 is combined with the RAM 72, and is provided by a hardware for executing an arithmetic processing. For example, the processor 71 is provided by a central processing unit (CPU). The processor 71 executes, by accessing the RAM 72, various processes for functioning as the functional blocks described later. The RAM 72 is provided by a volatile storage medium.

The storage 73 includes a non-volatile storage medium such as a flash memory. The storage 73 stores an image generation program as firmware and various drawing data for generating the composite image. The drawing data includes data indicating a shape of a projection surface TS, data indicating a three dimensional (3D) model of the own vehicle appearance, data indicating a 3D model of each component of the own vehicle, or the like. For example, the components for which 3D model data are prepared include tires, the steering wheel, instrument panel, pillars, body panels, or the like. Executing the image generation program by the processor 71 corresponds to executing the display control method that is a method corresponding to the image generation program.

The communication IF 74 is a circuit module that functions as an interface for communicating with other devices. The communication IF 74 is provided by an analog circuit element, an IC, or the like. The details of the image generation ECU 70 will be described later.

Figure 2:
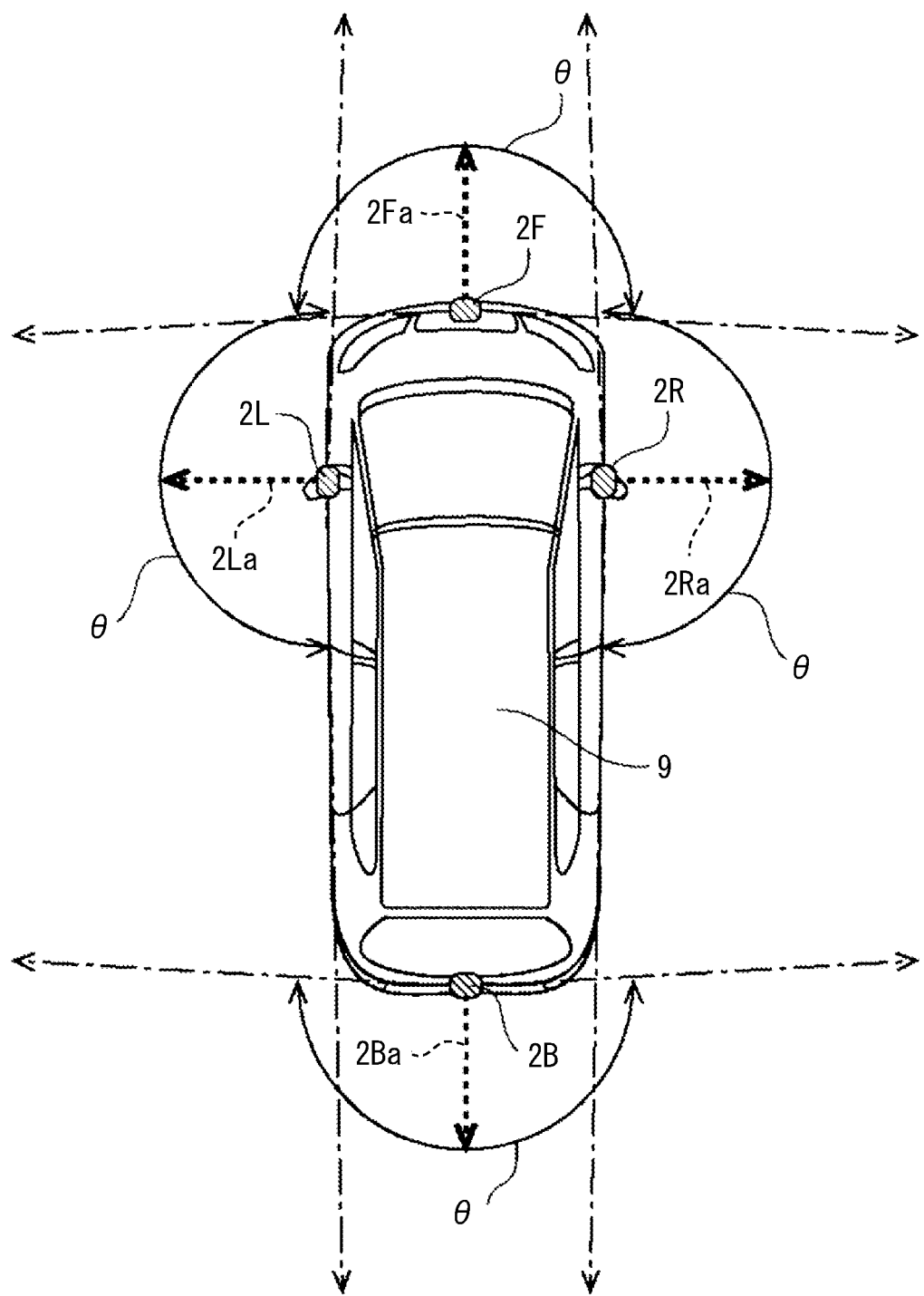
FIG. 2 is a diagram showing an installation position and an image capturing range of each camera.

The camera 2 is a vehicle mounted camera, and captures images indicating the surrounding of own vehicle and outputs the captured image data to the image generation ECU 70. Each camera 2 includes at least a lens and an image capturing element, and captures the image indicating the peripheral of the own vehicle. The cameras 2 are attached to different mounting positions of the own vehicle so as to capture images having different ranges. As shown in FIG. 2, the peripheral image display system 1 of the present embodiment includes a front camera 2F, a rear camera 2B, a right camera 2R, and a left camera 2L as the cameras 2. These four cameras 2 are attached to different positions of the own vehicle, and capture images indicating the surrounding of the own vehicle in different directions. The following describes specific examples.

The front camera 2F is an image capturing device that captures images in the front direction of the vehicle. The front camera 2F is attached to a front end of the own vehicle, such as a front grill, with its optical axis 2Fa facing the front direction of the own vehicle. When the vehicle 9 travels in forward direction, the front camera 2F functions as the camera 2 that captures images in the traveling direction.

The rear camera 2B is an image capturing device that captures an image in the rear direction of the vehicle. The rear camera 2B is attached to a rear end of the own vehicle, such as a predetermined position on a rear surface of the vehicle body close to a rear license plate or a rear window with its optical axis 2Ba facing the rear direction of the own vehicle. When the vehicle 9 travels in rearward direction, the rear camera 2B functions as the camera 2 that captures images in the traveling direction.

The right camera 2R is an image capturing device that captures an image on right side of own vehicle. For example, the right camera 2R is attached to a right side mirror with its optical axis 2Ra facing in right direction of own vehicle. The left camera 2L is an image capturing device that captures an image on left side of own vehicle. For example, the left camera 2L is attached to a left side mirror with its optical axis 2La facing in left direction of own vehicle.

A wide angle lens, such as a fisheye lens may be adopted as the lens for each camera 2, and each camera 2 has a view angle θ of 180 degrees or more. Therefore, by using four cameras 2, it is possible to capturing an image indicating the entire surrounding of own vehicle. The mounting position of each camera 2 described above may be properly changed as necessary. For example, the front camera 2F may be attached to a rearview mirror, an upper end of the windshield, or the like. For example, the right camera 2R or the left camera 2L may be arranged close to a base of A pillar or B pillar. The camera 2 may be retrofitted, for example, on the roof, on the dashboard, close to the window frame, or the like.

The mounting mode data that indicates the mounting position and mounting posture of each camera 2 relative to the vehicle 9 may be is stored in the storage 73. For example, the mounting position of each camera 2 may be represented as a point in a vehicle three-dimensional (3D) coordinate system which is a three-dimensional coordinate system with a center defined on a predetermined position of the vehicle 9. For example, the X axis of the vehicle three-dimensional coordinate system may be set to be parallel to the left-right direction of the vehicle 9. The Y axis of the vehicle three-dimensional coordinate system may be set to be parallel to the front-rear direction of the vehicle. The Z axis of the vehicle three-dimensional coordinate system may be set to be parallel to the height direction of the vehicle. For example, the right direction of the vehicle may correspond to a positive direction of the X axis, the front direction of the vehicle may correspond to a positive direction of the Y axis, and the upward direction of the vehicle may correspond to a positive direction of the Z axis. For example, the center of the vehicle 3D coordinate system may be set to a center of the rear wheel shaft.

The display 3 includes a thin display panel, such as a liquid crystal display panel, and displays various types of information and images on the thin display panel. The display 3 may be arranged on the instrument panel of own vehicle so that the user can visually recognize the screen. The display 3 may be integrated with the image generation ECU 70 by being arranged together with the image generation unit 70 in the same housing. The display 3 may also be provided by a separate device arranged separate from the image generation ECU 70. The display 3 includes a touch panel 4 disposed on the display panel, and is able to accept operations made by the user.

For example, the touch panel 4 may be provided by a capacitance type touch panel, and outputs a signal indicative of a position touched by the user. Herein, the user mainly refers to a driver who is an occupant seated in the driver's seat of the vehicle. The user may include an occupant seated in the passenger seat of the vehicle.

The operation button 5 is an operation component that accepts an operation made by the user on content displayed on the display 3. For example, the operation button 5 may be provided by a switch for displaying the composite image generated by the image generation ECU 70 on the display 3 and changing a viewpoint position of the composite image. For example, the operation button 5 may be provided on the steering wheel of own vehicle, and mainly receives an operation made by the driver of own vehicle. The user can perform various operations on the peripheral image display system 1 using the operation buttons 5 and the touch panel 4. When the user operates the operation button 5 or the touch panel 4, an operation signal indicating the content of the operation is input to the image generation ECU 70. The operation button 5 may also be arranged on the instrument panel.

The peripheral image display system 1 may include, as an operation component, a traveling mode switch that enables the driver to switch the travel mode of the vehicle 9 from the normal mode to the off-road mode. The operation component for switching the travel mode may be a dial type switch. The shift lever of own vehicle may be equipped with the traveling mode switch.

The vehicle state sensor 6 detects a state quantity related to traveling control of the own vehicle. More specifically, the vehicle state sensor 6 is a sensor group including one or more sensors. The vehicle state sensor 6 includes a wheel speed sensor 6s. The wheel speed sensor 6s detects a wheel speed based on a rotation state of the own vehicle's wheel. As the wheel speed sensor 6s, a sensor that detects the rotation of the wheel based on a change in a pulse signal can be adopted. In this case, the number of pulse signals obtained per unit time increases with an increase of rotation speed of the wheel. The wheel speed sensor 6s does not have to be a sensor that directly detects the wheel speed as a detection target, but may be a sensor that detects a state quantity used for calculating the wheel speed. The wheel speed sensor 6s detects the wheel speed of each wheel of own vehicle. For example, when the own vehicle has four wheels, that is, a front right wheel, a front left wheel, a rear right wheel, and a rear left wheel, the rotation speed of each wheel is detected individually.

The vehicle state sensor 6 may also include a shift sensor, a vehicle speed sensor, a steering angle sensor, an acceleration sensor, or the like, in addition to the wheel speed sensor 6s. The shift sensor detects a shift position. The vehicle speed sensor detects a travelling speed of own vehicle. The steering angle sensor detects a rotation angle of the steering wheel of own vehicle. The acceleration sensor detects an acceleration acting on the own vehicle in at least one of the front-rear direction, the left-right direction, and the up-down direction. For example, a 3-axis accelerometer may be adopted as the acceleration sensor. A detection value of the acceleration sensor may be used for determining a vehicle posture with respect to the horizontal plane.

The type of sensor included in the peripheral image display system 1 as the vehicle state sensor 6 may be properly designed as necessary, and it is not necessary to include all of the above-mentioned sensors in the peripheral image display system. The vehicle state sensor 6 may also include a vehicle height sensor, a gyro sensor, an azimuth angle sensor, or the like. Each sensor outputs, to the image generation ECU 70, data indicating a current value of the state quantity set as the detection target.

Figure 3:
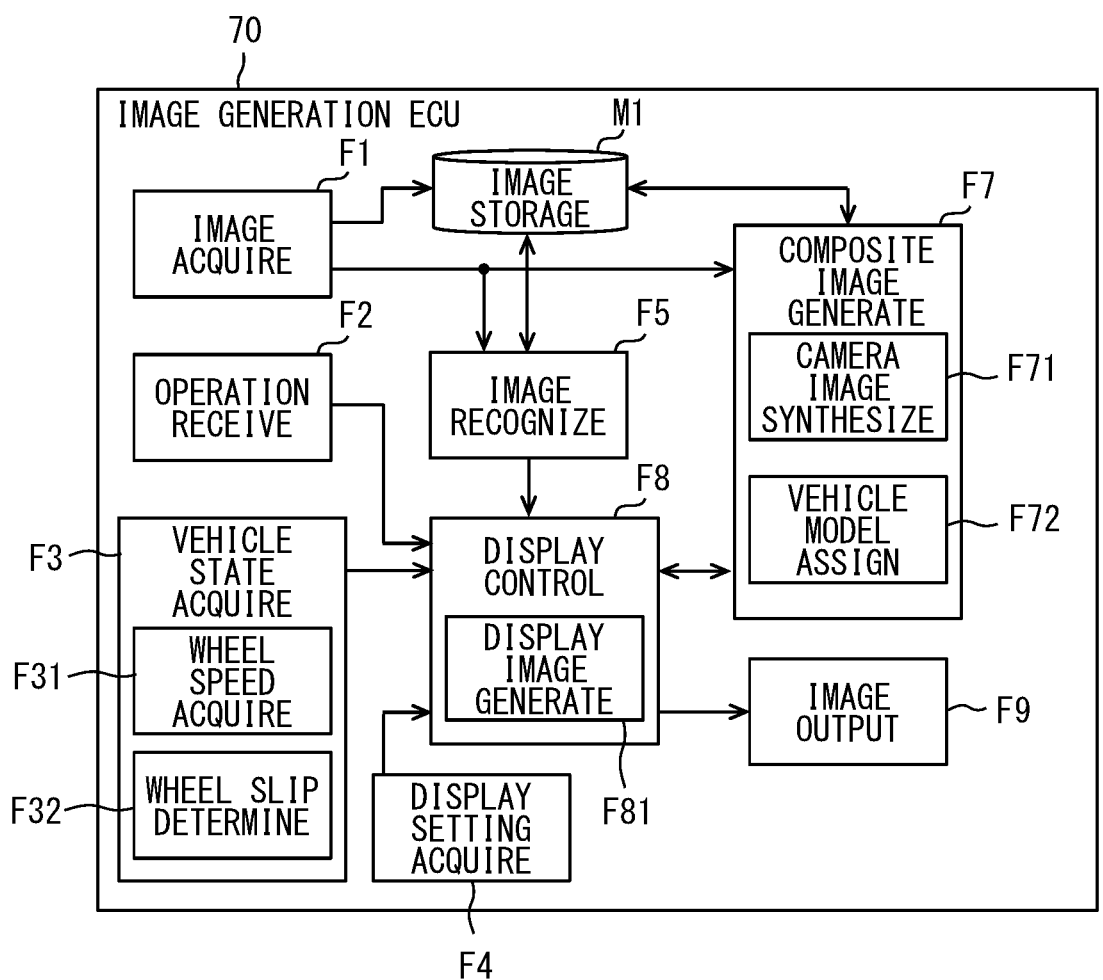
FIG. 3 is a block diagram showing a configuration of an image generation ECU.

As shown in FIG. 3, the image generation ECU 70 includes, as functional blocks, an image acquisition unit F1, an operation reception unit F2, a vehicle state acquisition unit F3, a display setting acquisition unit F4, an image recognition unit F5, a composite image generation unit F7, a display control unit F8, and an image output unit F9. The image generation ECU 70 includes an image storage M1, which is a memory for temporarily storing the image data. For example, the image storage M1 may be provided by partial storage area of the RAM 72. In the image storage M1, the vehicle position information and the direction information of the vehicle 9 at the time of capturing the image may be stored in association with the image captured by each camera 2.

The image acquisition unit F1 acquires image data captured by each camera 2. By combining the image data captured by each camera 2, image data indicating the entire surrounding of the own vehicle can be obtained. The image acquisition unit F1 converts the image signal output from the camera 2 into digital image data in a data format, and then outputs the converted image data to the image recognition unit F5 and the composite image generation unit F7.

For example, the image storage M1 stores the image data captured by each camera 2 every time the own vehicle moves a predetermined distance, which is defined in advance. The stored image data is associated with the position information and posture information of the own vehicle, which are separately acquired from the image data. For example, the predetermined distance may be set to 0.1 m, 0.3 m, 0.5 m, or the like. Hereinafter, the predetermined distance for storing the image data is also referred to as a storage distance. When the storage distance is set to 0.1 m, compared with the latest stored image data, the image data to be stored next is image data obtained by capturing a range displaced by 0.1 m in the traveling direction. Instead of the storage distance, storage time interval may be set and the image data captured by each camera 2 may be stored every time the storage time interval elapses.

For example, when the vehicle is moving forward, the image storage M1 may store image data captured by the front camera 2F. The front camera 2F captures images of the ground from directly below the front end of the vehicle to 3 meters ahead. When the vehicle is moving backward, the image storage M1 may store image data captured by the rear camera 2B. The rear camera 2B captures images of the ground from directly below the rear end of the vehicle to 3 meters behind.

Various modes can be adopted as the storage mode of the image data in the image storage M1. For example, the image acquisition unit F1 overwrites and stores new data in the oldest updated area in the image storage M1. That is, the image storage M1 may be configured as a ring buffer. The ring buffer is a storage area logically arranged in a ring shape. The image acquisition unit F1 may be configured to store the image frames acquired within the latest storage interval in a region different from the image data acquired for every storage distance described above. The image data stored in the image storage M1 is used by the composite image generation unit F7. The image acquisition unit F1 may perform, according to the lens characteristics, image processing such as distortion correction, increase or decrease of size, cropping to the image acquired by the camera 2. In this case, the image data obtained after the image processing is stored in the image storage M1.

The operation reception unit F2 receives the operation signal output from the operation button 5 or the touch panel 4. The operation signal indicates the content of the user's operation made on the operation button 5 or the touch panel 4. As a result, the operation reception unit F2 accepts the user's operation for displaying image data, such as a composite image. The operation reception unit F2 outputs data corresponding to the received operation signal to the display control unit F8.

The vehicle state acquisition unit F3 acquires information indicating the state of own vehicle from other devices of own vehicle, such as the vehicle state sensor 6. The vehicle state acquisition unit F3 includes a wheel speed acquisition unit F31 and a wheel slip determination unit F32. The wheel speed acquisition unit F31 acquires the wheel speed of each wheel detected by the wheel speed sensor 6s. For example, the wheel speed acquisition unit F31 may individually acquire the wheel speed of the right front wheel, the wheel speed of the left front wheel, the wheel speed of the right rear wheel, and the wheel speed of the left rear wheel.

The wheel slip determination unit F32 determines whether a wheel of own vehicle is in slip state. For example, when one of the front wheels is in slip state, a magnitude of friction between the right front wheel and the ground is significantly different from a magnitude of friction between the left front wheel and the ground. Thus, there is a large difference between the wheel speed of the right front wheel and the wheel speed of the left front wheel. When the difference between the wheel speed of the right front wheel and the wheel speed of the left front wheel is equal to or larger than a predetermined slip state speed, the wheel slip determination unit determines that the wheel is in slip state. In a non-slip state, the wheel speed of the right front wheel may be different from the wheel speed of the left wheel when the vehicle is travelling a curve. With consideration of this case, the slip state speed is properly set so that the non-state and the slip state of vehicle can be appropriately determined.

The method for determining slip state of wheel is not limited to the above-described method. Instead of the wheel slip determination unit F32 determining whether the wheel is in the slip state based on the wheel speed, an ECU other than the image generation ECU 70 may determine the slip state of wheel. In this configuration, the wheel slip determination unit F32 acquires the wheel slip determination result determined by the ECU different from the image generation ECU 70.

The vehicle state acquisition unit F3 acquires, from various sensors, the shift position, the acceleration in each detection axis direction, the vehicle speed, the steering angle, and the like. The vehicle state acquisition unit F3 may acquire various state quantities from other ECUs. For example, information such as the steering angle may be acquired from an ECU included in the steering system. The vehicle state acquisition unit F3 may acquire, from the image recognition unit F5, change amount of movement distance per unit time and change amount of direction per unit time. That is, the vehicle state acquisition unit F3 can acquire various information regarding the state of the own vehicle not only from the sensor but also from other ECUs, the image recognition unit F5, or the like. The vehicle state acquisition unit F3 may combine various types of information and calculate the moving distance of the vehicle 9, the amount of direction change of the vehicle 9, or the like. The direction of the vehicle 9 may include not only the yaw angle in which the vehicle 9 is facing, but also a pitch angle, a roll angle, or the like.

The display setting acquisition unit F4 acquires the setting of image to be displayed on the display 3. The display setting may include a setting related to a brightness of the display 3. The display setting may include is a setting related to a display time and display duration. The display setting may include a setting related to a viewpoint position of the image to be displayed. The display setting may include a setting related to a display effect when switching the display image. The display setting can be changed by the user operation made on the touch panel 4 or on the operation button 5.

The image recognition unit F5 detects a position of a predetermined detection target, a type of the predetermined detection target, or the like by analyzing the image acquired from the camera 2. The image recognition unit F5 has a function identifier that identifies the type of detection target based on image feature vector. The image recognition unit F5 identifies an object by using, for example, convolutional neural network (CNN) or deep neural network (DNN) to each of which deep learning is applied. The detection target includes pedestrians, other vehicles, road markings such as lane markings marked on paved roads, and road edges. In addition to the line provided as a lane marker, the road marking may include a line indicating a parking frame or the like.

The image recognition unit F5 is able to estimate, based on feature points preliminarily set on the image, the travelling amount and the direction change amount of own vehicle by comparing the feature points in one frame with the feature points in different frame. That is, the travelling amount and the direction change amount are estimated based on change amount of vehicle position. For example, the image recognition unit F5 may estimate a current position with respect to a reference point, the direction change amount of vehicle body, the yaw rate, and the like by using an optical flow method or the like. The optical flow is known as an inter-frame difference method. Optical flow is information that indicates the movement of an object included in image data as a vector. The object recognition result of the image recognition unit F5 and the estimation result of own vehicle position and the like are output to the display control unit F8, the vehicle state acquisition unit F3, and the composite image generation unit F7.

The composite image generation unit F7 perform image processing for generating the composite image such as a traveling direction image AP and a transparent image CP, which will be described later. The composite image generation unit F7 projects multiple image data captured by the camera 2 on a virtual projection surface TS, and generates the composite image viewed from the virtual viewpoint VP using the data projected on the projection surface TS.

Figure 4:
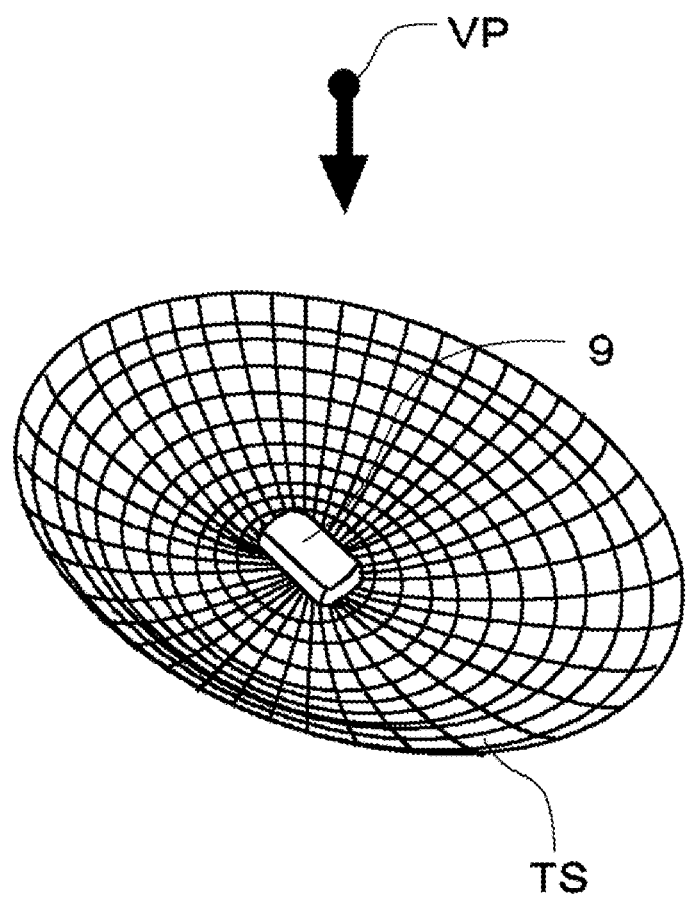
FIG. 4 is a diagram showing a projection surface used for generating a traveling direction image.

As conceptually shown in FIG. 4, the projection surface TS is a virtual three-dimensional plane corresponding to the surrounding area of own vehicle. The central area of the projection surface TS is defined as a vehicle area corresponding to the position of own vehicle. For example, the vehicle area is set as a rectangular flat portion. The vehicle area includes an area that overlaps with the own vehicle in the height direction of own vehicle. In other words, the vehicle area includes an area that cannot be directly imaged by the camera 2. The projection surface TS has a planar shape along the horizontal direction of the vehicle in the vicinity of the vehicle area, and has a curved shape at a position away from the vehicle area and the inclination of curved shape increases with an increase of distance from the vehicle area. That is, the projection surface TS has a downwardly convex curved shape as a whole. Projecting a camera image on the projection surface TS corresponds to texture mapping the camera image on the projection surface TS.

The shape of the projection surface TS can be changed as appropriate. The shape of the projection surface TS may be set to a horizontal plane in the entire region. The projection surface TS may have a shape in which a curved region, such as a downward convex area starts from the edge portion of the vehicle area without the above-described planar area.

The display control unit F8 controls the operation of composite image generation unit F7. For example, the display control unit F8 controls the virtual viewpoint VP used to generate the composite image. The composite image generation unit F7 includes a camera image composition unit F71 and a vehicle model assign unit F72. The camera image composition unit F71 projects image captured by each camera on the projection surface TS. The vehicle model assign unit F72 arranges a model image of the vehicle 9 at a predetermined position on the projection surface TS on which the image captured by camera is projected.

The display control unit F8 comprehensively controls the entire operation of image generation ECU 70. For example, the display control unit F8 controls the composite image generation unit F7 and the display image generation unit F81 based on the information output from the operation reception unit F2 and the vehicle state acquisition unit F3. As a result, the composite image and the display image DP according to the traveling state of own vehicle and the user's setting are generated.

The display control unit F8 determines whether the traveling direction of own vehicle is the forward direction or the rearward direction based on, for example, a signal output from the shift sensor or the rotation direction of the tire. The display control unit F8 determines whether a traveling environment is the off-road based on the input signal from the traveling mode switch.

When generating the composite image, the display control unit F8 sets the position and the visual line direction of the virtual viewpoint VP based on the traveling direction of the own vehicle and the signal from the touch panel 4 or the operation button 5. For example, the virtual viewpoint VP may be set as a bird's-eye view or a driver's-eye view. FIG. 4 illustrates the viewpoint position when the virtual viewpoint VP is set as the bird's-eye view.

When the bird's-eye view is set as the virtual viewpoint VP, the viewpoint position is directly above the own vehicle and the visual line direction directly points downward. The bird's-eye view can be applied when generating a bird's-eye view image which is an image of the own vehicle and its surrounding viewed from directly above the own vehicle. The view angle of the bird's-eye view can be appropriately adjusted to include the vicinity of own vehicle. The viewpoint position of the bird's-eye view is not limited to directly above the own vehicle. For example, the view position may be a position shifted from directly above the own vehicle in the rear direction, in the front direction, or in the lateral direction. The bird's-eye view corresponds to an example of a vehicle outside viewpoint, which is a viewpoint in which the virtual viewpoint VP is arranged outside the vehicle compartment.

The driver viewpoint is the virtual viewpoint VP in which the viewpoint position is set to assumed positions of the driver's eyes in the vehicle compartment. For example, the visual line direction of the driver's viewpoint may be set diagonally forward and downward so as to include the vicinity of the front wheels. For example, the diagonally downward direction may be a direction directed downward by about 20 degrees to 30 degrees from the vehicle horizontal plane. With the forward diagonally downward direction as a reference direction, the visual line direction of the driver's viewpoint may be configured to be changeable in any direction based on the user's operation on the touch panel 4. The view angle of the driver's viewpoint may be appropriately adjusted to include the vicinity of the front wheels.

The assumed positions of the driver's eyes may be set close to the headrest of the driver's seat. As the assumed positions of the driver's eyes, an eyellipse set for each vehicle model may be used. The eyellipse is a virtual space area defined for each vehicle corresponding to vehicle type. The eyellipse is set in a virtual ellipsoidal shape based on the eye range that statistically represents the spatial distribution of the occupant's eye points. The driver's viewpoint corresponds to an example of a vehicle inside viewpoint, which is a viewpoint in which the virtual viewpoint VP is arranged in the vehicle compartment. As another example, the position of the driver's viewpoint may be set at a position shifted from the assumed positions of the driver's eyes. For example, the driver's viewpoint may be set at a position shifted from the assumed positions of the driver's eyes toward the passenger seat. For example, a position in the middle of the driver's seat and the passenger seat may be set as the position of the driver's viewpoint.

Figure 5:
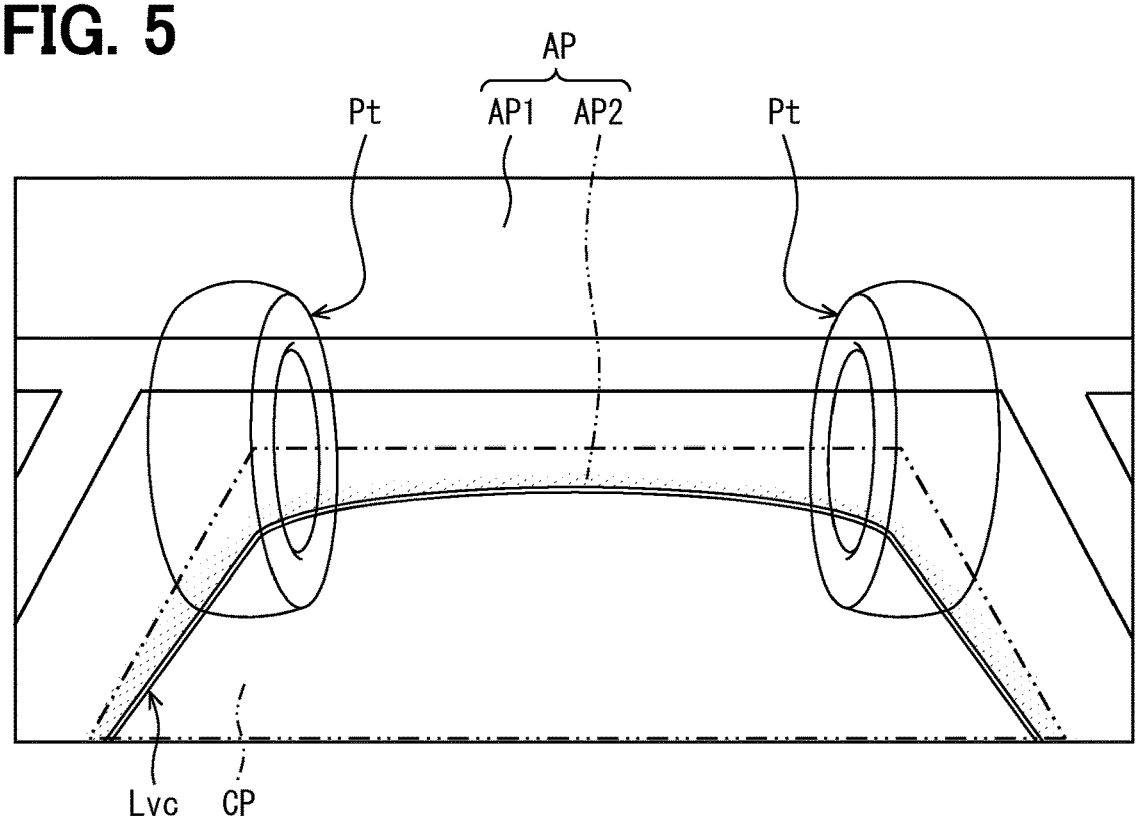
FIG. 5 is a diagram showing a traveling direction image that includes a transparent image.

The image generation ECU 70 of the present embodiment has, as an operation mode, a peripheral image display mode for displaying a traveling direction image AP as shown in FIG. 5. Details of the method of generating the traveling direction image AP will be described later.

The traveling direction image AP may include a transparent image CP which is a composite image showing a road surface under the floor of the vehicle as if the underfloor of the vehicle body is transparent. When the traveling direction image AP includes the transparent image CP showing road surface under the vehicle floor, the peripheral image display mode may also be referred to as an underfloor display mode. The display control unit F8 may switch the display mode based on at least one of the specific position of the shift lever or the user operation. For example, the display control unit F8 may set the display mode to the peripheral image display mode in response to the peripheral image display condition described later being satisfied. In the following description, an image generated with the virtual viewpoint VP set as the driver viewpoint is described as the traveling direction image AP as an example.

Figure 6:
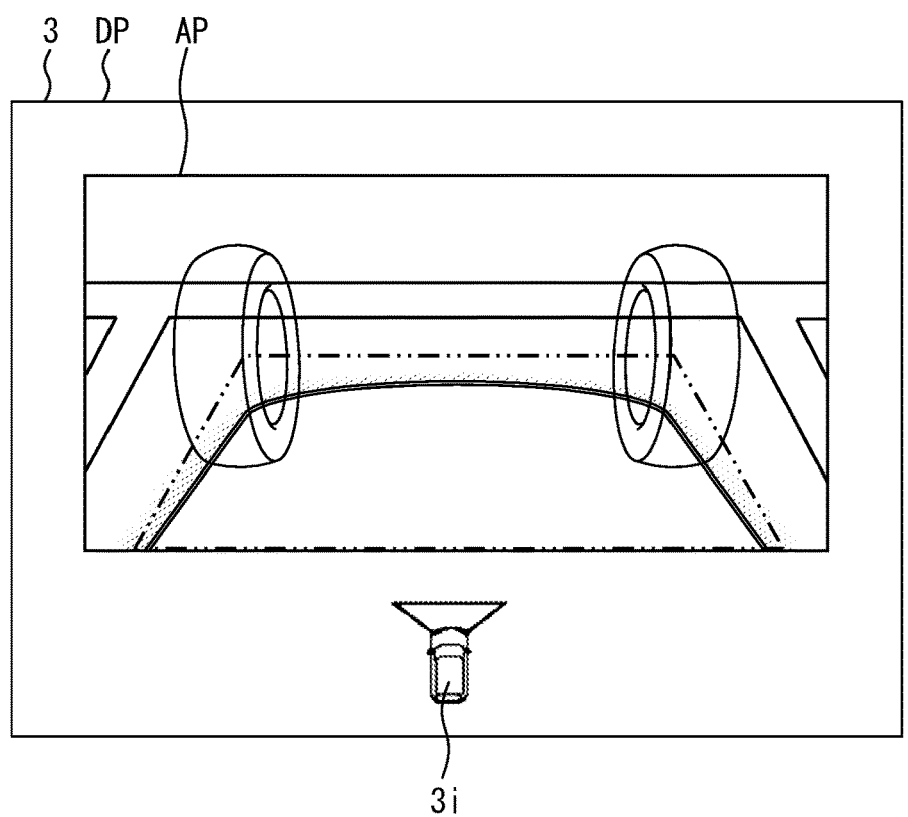
FIG. 6 is a diagram showing a display image.

The display image generation unit F81 generates the display image DP as shown in FIG. 6. The display image DP is an image to be displayed on the display 3. The display image DP includes a traveling direction image AP and an icon image 3i. The icon image 3i symbolically indicates the range of the peripheral image displayed on the display 3. FIG. 6 shows an image in which the front region of the vehicle is set as the range of the peripheral image.

The display image generation unit F81 generates the display image DP using the composite image composited by the composite image generation unit F7, the camera image acquired by the image acquisition unit F1, the icon image 3i, and the like. The combination of images to be included in the display image DP is determined by the display control unit F8 according to the traveling direction of the own vehicle and the user's operation on the touch panel 4 or the like.

The image output unit F9 converts the display image DP generated by the display image generation unit F81 to a video signal, and outputs the video signal to the display 3. Thus, the display image DP is displayed on the display 3. The display image DP including the composite image showing the periphery of the own vehicle and viewed from the virtual viewpoint VP is displayed on the display 3.

Hereinafter, the operation executed by the composite image generation unit F7 to generate the traveling direction image AP including the transparent image CP will be described. The camera image composition unit F71 projects each camera image acquired by the image acquisition unit F1 on the projection surface TS in a virtual three-dimensional space as shown in FIG. 4. The projection position of each camera image on the projection surface TS is defined in advance related to the corresponding information, such as table data.

For example, the camera image composition unit F71 projects the image data of the front camera 2F on the front region of the projection surface TS. The camera image composition unit F71 projects the image data of the rear camera 2B on the rear region of the projection surface TS. The camera image composition unit F71 projects the image data of the right camera 2R on the right region of the projection surface TS, and projects the image data of the left camera 2L on the left region of the projection surface TS.

Various methods can be adopted for displaying image in an overlapping region. The overlapping region is a region where image capture ranges of two or more cameras 2 overlap with one another. For example, the image data of multiple cameras 2 may be blended an appropriate ratio, or image data of multiple cameras 2 may be connected together at a predetermined boundary line.

From the past image stored in the image storage M1, an image showing a portion presumed to be located in the vehicle area is extracted. Then, rotation correction is executed to the extracted image as necessary, and then the image is projected on the vehicle area. Since the image projected on the vehicle area is an image of the area located directly under the own vehicle, that is, an image of the underfloor, the image may be referred to as an underfloor image.

For example, when the own vehicle is moving forward, the underfloor image may be generated using a front camera image captured 3 meters behind the current position as a past image. When the own vehicle is moving rearward, the underfloor image may be generated by using the rear camera image captured 3 meters ahead of the current position as the past image. That is, an underfloor image is generated using the past image when the own vehicle is located at a position opposite to the current position in the traveling direction.

When the own vehicle is moving forward, the underfloor image may be generated using the front camera images captured at multiple time points between the position 3 meters behind the current position and the current position as the past images. In this case, one underfloor image is generated based on multiple past images. The same is applied when the vehicle is moving rearward. The image data of the past image projected on the underfloor portion, which corresponds to the vehicle area, may be updated at any time as the vehicle 9 moves.

The display control unit F8 controls the composite image generation unit F7 to set the virtual viewpoint VP for the three-dimensional space that includes the projection surface TS. The composite image generation unit F7 can set the virtual viewpoint VP directed to an arbitrary visual line direction from an arbitrary viewpoint position within the three-dimensional space.

The vehicle model assign unit F72 arranges various image elements about the own vehicle on the virtual three-dimensional space including the projection surface TS on which the camera images are projected. When the virtual viewpoint VP is set outside the vehicle compartment, such as the bird's-eye view, a vehicle boundary line Lvc indicating the road surface range where the vehicle bottom is located is assigned on the vehicle area. The vehicle boundary line Lvc is indicates an outline of the vehicle when the vehicle body is projected from above perpendicular to the road surface, and corresponds to a line indicating an outer shape of the vehicle 9 in the bird's-eye view.

The following will describe the traveling direction image AP generated when the virtual viewpoint VP is arranged in the vehicle compartment, such as the driver viewpoint with reference to FIG. 5. The traveling direction image AP shown in FIG. 5 assumes a case where the own vehicle is located in a parking lot where parking spaces are marked by parking frames. The traveling direction image AP mainly shows a periphery of the own vehicle in the traveling direction.

The traveling direction image AP includes a first traveling direction image AP1 and a second traveling direction image AP2. The first traveling direction image AP1 corresponds to a current image that is currently captured by the camera 2 and projected on the projection surface. The second traveling direction image AP2 corresponds to a past camera image that is captured by the camera 2 in the past and projected on the projection surface. The first traveling direction image AP1 shows a capturing range that can be captured in real time by the camera 2, and the second traveling direction image AP2 shows a capturing range that cannot be captured in real time. The underfloor image showing the road surface in the vehicle area corresponds to the second traveling direction image AP2 that shows a capturing range that cannot be captured in real time by the camera 2. In the figures, a boundary between the first traveling direction image AP1 and the second traveling direction image AP2 is shown by a two-dot chain line.

When the virtual viewpoint VP is the driver's viewpoint, the vehicle model assign unit F72 may arrange a 3D tire model Pt, a 3D body model, a 3D interior model at predetermined positions in the three-dimensional space in addition to the vehicle boundary line Lvc. In the figures, a case where only the 3D tire model Pt is arranged is illustrated as an example. The 3D tire model Pt is a 3D model of the tire, and is set to be translucent as a whole. The 3D tire model Pt may include only opaque contour line or translucent contour line of the tire. That is, a portion other than the contour line of the 3D tire model Pt may be set to be colorless and transparent.

The term translucent here is not limited to a state where the transparency is 50%, and may include, for example, a range of transparency from 50% to 80%. That is, the term translucent may include a state that vaguely indicates existence of the target. Transparency is a parameter indicating that the higher the value is, the more transparent it is. In the present disclosure, the transparency of 100% corresponds to the completely transparent state. The transparency or opacity of an image is a concept corresponding to the alpha value of a pixel. Generally, the smaller the alpha value, the higher the degree of transparency.

The 3D body model is a 3D model of the vehicle body, and is set to be translucent as a whole. The 3D body model may include only opaque contour line or translucent contour line of the vehicle body. That is, a portion other than the contour line of the 3D body model may be set to be colorless and transparent. The 3D interior model is a 3D model showing an instrument panel, a steering wheel, and A pillars.

The 3D tire model Pt, the 3D body model, the 3D interior model, and the like are 3D models showing the component members of the own vehicle, and may be referred to as component member models. The 3D model arranged in the three-dimensional space for generating the composite image may be adjusted as appropriate. For example, the arrangement of 3D tire model Pt, the 3D body model, the 3D interior model, and the like may be omitted.

The vehicle model assign unit F72 may draw scale lines indicating a distance from the vehicle end to a portion of the image and vehicle width lines indicating the vehicle width. The vehicle model assign unit F72 may draw a planned trajectory line, which is a line indicating planned traveling trajectory corresponds to the steering angle of the vehicle 9, as another image element related to the vehicle 9. The vehicle width line may also function as the planned trajectory line. The vehicle boundary line Lvc, the planned trajectory line and the like show information about the vehicle 9. Thus, the vehicle boundary line Lvc, the planned trajectory line and the like may be referred to as a vehicle information image. The planned trajectory line, the scale lines, the vehicle width lines, and the like may also function as guidance information of the driver's driving operation. Therefore, the displayed line, such as the planned trajectory line may be referred to as a guidance line.

The composite image generation unit F7 performs rendering to the various image elements existing in the three-dimensional space including the projection plane TS according to the virtual viewpoint VP. The composite image generation unit F7 cuts out an image element included in a predetermined view angle when viewed from the virtual viewpoint VP by using the image data in which various image elements are rendered. As a result, the composite image generation unit F7 generates the composite image showing the area under the floor of the own vehicle and the area around the own vehicle as viewed from the virtual viewpoint VP. For example, as the transparent image CP, an underfloor image in which the bottom of the vehicle body is transparent is generated. In the above description, an embodiment in which the composite image is generated in the order of projecting the camera images on the projection surface TS and then adding image elements is described as an example. Alternatively, each process described above may be executed in parallel.

Various methods may be adopted for generating the composite image. For example, the road surface image generated based on the camera image, the vehicle boundary line Lvc, and the three-dimensional model of the component members of the vehicle 9 may be arranged in different layers. For example, the composite image may be generated by combining three layers, such as a camera image layer, a boundary line layer, and a 3D model layer. The camera image layer includes the road surface image which is an image of the projection surface TS on which the camera image is projected. The boundary line layer is a layer on which the vehicle boundary line Lvc is arranged. The 3D model layer includes the three-dimensional model such as the 3D tire model Pt. When multiple layers are combined, the camera image layer is set as the lowermost background layer, and the boundary line layer and the 3D model layer may be superimposed on the camera image layer. The layer structure may also be changed as appropriate. When each image element is treated individually by using multiple layers, the image in which each layer is finally integrated becomes the composite image.

The following will describe the display image DP to be displayed on the display 3. As shown in FIG. 6, the display image generation unit F81 generates, as the display image DP, an image including the traveling direction image AP and the icon image 3i The display content of the display image DP is not limited to the above example, and can be changed as appropriate. For example, a right camera image captured by the right camera 2R and a left camera image captured by the left camera 2L may be arranged together with the traveling direction image AP. Alternatively, the traveling direction image AP, the right camera image, and the left camera image may be displayed in panoramic manner as one continuous panoramic image. According to such a layout of the display image DP, it is possible to visually notify the driver of the left and right periphery while maintaining good visibility of the traveling direction image AP. By looking at the display image DP, the driver can recognize the state of the ground near the front wheels when moving forward, and can also recognize the situation on the lateral periphery of the vehicle at the same time.

The right camera image may be generated by cutting out a portion from the camera image captured by the right camera 2R. In another example, the right camera image may be generated by cutting out a portion of the composite image obtained by rendering within a predetermined view angle when a right portion of own vehicle is set as the virtual viewpoint VP. The left camera image may be generated by the same generation method as the right camera image using the camera image of the left camera 2L.

The icon image 3i can function as a switch for switching the display content of the display image DP in response to a touch operation made by the user. Whether the user touches the icon image 3i can be determined based on a touch position signal output from the touch panel 4. When the touch operation is made by the user on the icon image 3i and the touch operation is detected, the display control unit F8 uses, for example, the display image DP including only the traveling direction image AP as the peripheral image to the panoramic image including the left and right camera images as the peripheral image in addition to the traveling direction image.

The following will describe a peripheral image display process that includes a series of processes executed when the image generation ECU 70 generates and displays the display image DP. The image generation ECU 70 starts the flowchart shown in FIG. 7 in response to the peripheral image display condition being satisfied. The peripheral image display condition is a condition for activating the display of display image DP. For example, the image generation ECU 70 may determine that the peripheral image display condition is satisfied when the user operation is made on the operation button 5 by, for example, pressing the operation button 5. In another example, the image generation ECU 70 may be configured to determine that the peripheral image display condition is satisfied in response to a detection of a user operation made on the touch panel 4 for displaying the display image DP. The image generation ECU 70 may start the process in response to the operation reception unit F2 acquiring a signal indicating execution of an operation by the user for displaying the composite image.

Specific conditions for displaying the peripheral image may include the shift position indicating the setting state of the transmission, the vehicle speed, and the like. For example, the peripheral image display condition may include at least one of the shift position being set to a specific range or the vehicle speed being lower than a predetermined low speed threshold. The specific range that satisfies the peripheral image display condition may include a predetermined low range, a backward range, or the like. The predetermined low speed threshold may be, for example, 10 km/h, 15 km/h, 20 km/h, or the like. When the operation reception unit F2 accepts operation made by the user on the viewpoint switch via the touch panel 4 or the like in a state where the front camera image or the rear camera image is displayed on the display 3, the image generation ECU determines that the peripheral image display condition is satisfied.

Figure 7:
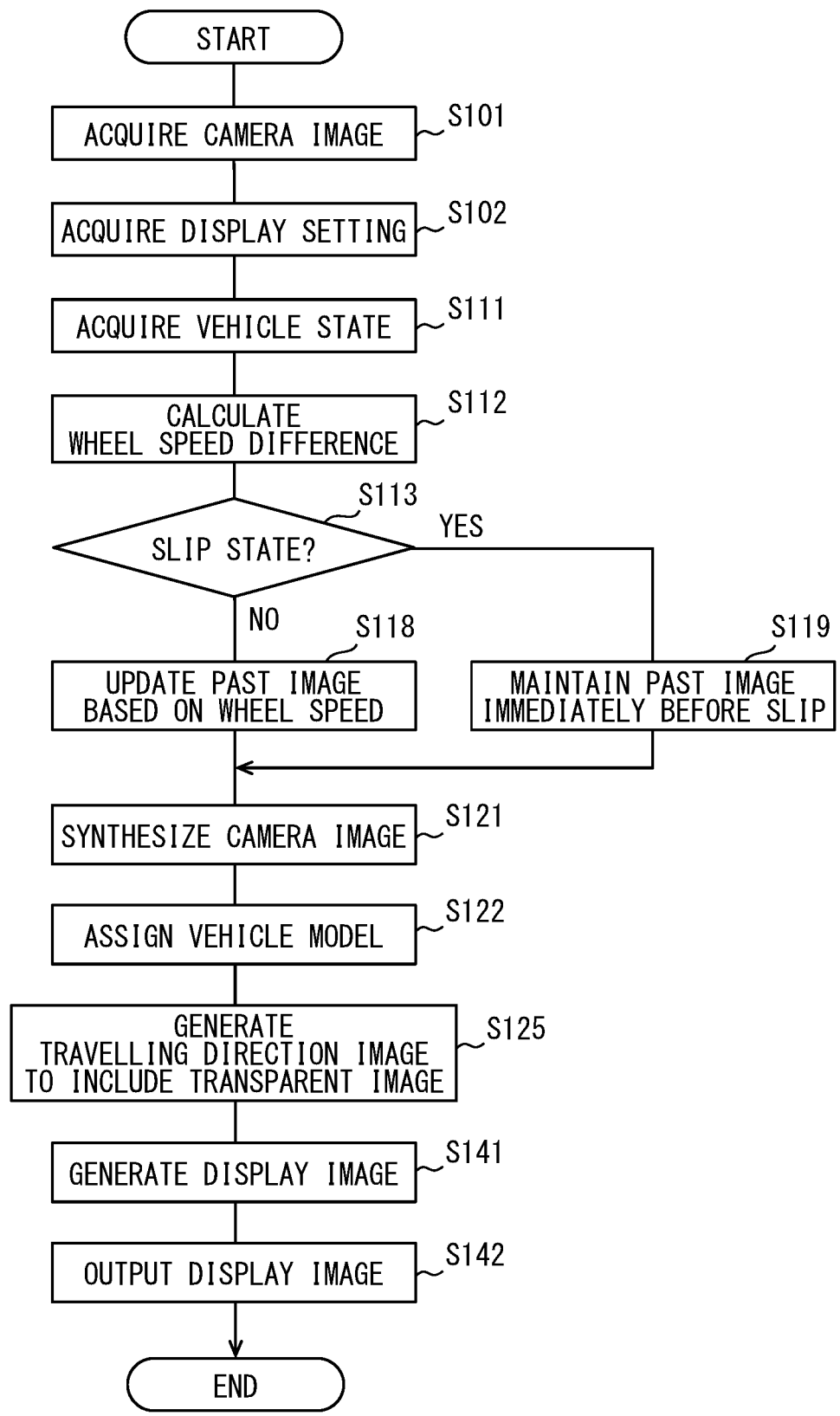
FIG. 7 is a flowchart showing a control process executed by a peripheral image display system.

The process shown in FIG. 7 may be repeatedly executed until a display end condition is satisfied. The display end condition may be satisfied, for example, in a case where the shift position is set to a range other than the specific range, in a case where the vehicle speed changes to a level equal to or higher than the predetermined low speed threshold, in a case where the operation button 5 is pressed again by the user. That is, the display end condition is set to be satisfied when the peripheral image display condition is no longer satisfied. When the image generation ECU 70 detects that the operation for deactivating the display of display image DP is made by the user on the touch panel 4, the image generation ECU 70 may determine that the display end condition is satisfied.

In S101, the image acquisition unit F1 acquires camera images obtained by each of the four cameras 2. The acquisition of camera images is repeated with the elapse of time, and the latest camera images are acquired in successive manner.

The image storage M1 stores the camera images captured by the cameras 2 in the traveling direction every time the own vehicle travels by the storage distance. The image acquisition unit F1 stores the image captured by the camera 2 in the traveling direction as a first storing process when a state in which the peripheral image display condition is not satisfied is switched to a state in which the peripheral image display condition is satisfied After acquiring the camera image, the process proceeds to S102.

In S102, the display setting acquisition unit F4 acquires the display setting. The display setting acquisition unit F4 acquires, for example, the setting of whether the virtual viewpoint VP is the driver view or the bird's-eye view.

When the transparent image CP is generated for the first time in response to the driving power being turned on, the default setting of the virtual viewpoint VP is activated. The default setting may include positions and visual line directions set by a designer or a user in advance. The default setting may set, for example, a driver's viewpoint so that the visual line direction is directed diagonally forward and downward. The virtual viewpoint VP may be set to the position and direction of the virtual viewpoint VP same as the last time display of transparent image CP. In this case, as a preparatory process, the display control unit F8 may be configured to save the setting data of the last time virtual viewpoint VP for displaying the transparent image CP in the RAM 72 or the like.

Further, the position and the visual line direction of the virtual viewpoint VP may be determined according to the traveling direction of own vehicle. For example, when the traveling direction of own vehicle is forward, the driver viewpoint whose visual line direction is directed diagonally forward and downward as described above may be adopted as the virtual viewpoint VP. For example, when the traveling direction of own vehicle is backward, the driver viewpoint whose visual line direction is directed diagonally backward and downward may be adopted as the virtual viewpoint VP. The visual line direction of the virtual viewpoint VP may be adjusted according to the steering angle.

The following will describe an example in which the driver viewpoint whose visual line direction is directed diagonally forward and downward is adopted as the virtual viewpoint VP. After acquiring the display setting, the process proceeds to S111.

In S111, the vehicle state acquisition unit F3 acquires the vehicle state. The vehicle state indicates the state of own vehicle, such as the shift position and the vehicle speed. Specifically, the wheel speed acquisition unit F31 of the vehicle state acquisition unit F3 acquires the wheel speed of own vehicle. After acquiring the vehicle state, the process proceeds to S112.

In S112, the vehicle state acquisition unit F3 calculates a wheel speed difference between the left wheel speed and the right wheel speed. More specifically, the difference between the wheel speed of right front wheel and the wheel speed of left front wheel is calculated as the wheel speed difference. As another example, the difference between the wheel speed of right rear wheel and the wheel speed of left rear wheel may be calculated as the wheel speed difference. After calculating the wheel speed difference, the process proceeds to S113.

In S113, the wheel slip determination unit F32 determines whether a wheel of own vehicle is in the slip state. The wheel slip determination unit F32 determines that one front wheel of own vehicle is in the slip state when the difference between the wheel speed of right front wheel and the wheel speed of left front wheel is equal to or greater than a predetermined slip state wheel speed. Alternatively, the wheel slip determination unit F32 may determine that one rear wheel of own vehicle is in the slip state when the difference between the wheel speed of right rear wheel and the wheel speed of left rear wheel is equal to or greater than the predetermined slip state wheel speed. At this time, it is preferable to calculate the difference between the left wheel speed and the right wheel speed by using the average speed value per unit time as the wheel speed of each wheel instead of the instantaneous speed value as the wheel speed of each wheel. With this configuration, it is possible to suppress an erroneous determination regarding the slip state.

The slip state determination method is not limited to the above-mentioned method in which the slip state is determined based on the difference between the left wheel speed and the right wheel speed. For example, when the wheel speed is remarkably high with respect to the output power of power source, such as an engine or a traveling purpose motor, the friction between the tire and the ground may be determined to be very small, that is, the vehicle is in the slip state.

When a determination result is acquired from an ECU that determines slip state based on the wheel speed other than the image generation ECU 70, the wheel slip determination unit F32 may acquire the determination result and adopt the acquired result as the slip state determination result.

In a case where at least one of the front wheel or the rear wheel of own vehicle is determined to be in the slip state (S113: YES), the process proceeds to S119. In a case where the entire wheels of own vehicle are not in the slip state, that is in the non-slip state (S113: NO), the process proceeds to S118.

In S118, the composite image generation unit F7 updates the past image used for generating the transparent image CP based on the wheel speed. More specifically, a distance traveled by the own vehicle may be calculated based on the wheel speed, and a camera image that previously captured the road surface under the floor of own vehicle at the current time may be acquired from the past images stored in the image storage M1 and set as the past image.

The latest camera image in the traveling direction is stored in the image storage M1 as a candidate for a new past image. Among the camera images stored as candidates of the past image, the camera image obtained by capturing the position of the vehicle passing under the floor of own vehicle is deleted from the image storage M1. In other words, with respect to the position under the floor of own vehicle as a reference, only the camera image in the traveling direction is stored as the candidate for the past image, and the camera image on the opposite side of the traveling direction is deleted from the image storage. After updating the past image based on the wheel speed, the process proceeds to S121.

In S119, the composite image generation unit F7 maintains the past image immediately before the wheel is determined to be in the slip state. In a case where the own vehicle is determined to be traveled by the storage distance in the traveling direction based on the wheel speed, the newly captured camera image is not stored and the currently stored candidate of the past image not deleted. After maintaining the past image immediately before the lip state, the process proceeds to S121.

In S121, the camera image composition unit F71 synthesizes the camera images. More specifically, the camera image composition unit F71 maps the image data of each camera 2 and the past image to predetermined positions on the projection surface TS as described above. In the non-slip state, the updated past image based on the wheel speed is projected on the vehicle area. In the slip state, the past image immediately before the slip state is projected on the vehicle area. After synthesizing the camera images, the process proceeds to S122.

In S122, the vehicle model assign unit F72 assigns the vehicle model, such as the vehicle boundary line Lvc or the 3D tire model Pt to the composite image. As other image elements, the planned trajectory line, the scale lines, the vehicle width lines, the 3D model other than the 3D tire model Pt, or the like may be added to the composite image. After assigning the vehicle model, the process proceeds to S125.

In S125, the composite image generation unit F7 generates the traveling direction image AP to include the transparent image CP. More specifically, the rendering process is carried out to the composite image after the vehicle model is added according to the virtual viewpoint VP, and the image element included in the predetermined view angle when viewed from the virtual viewpoint VP is cut out. When the virtual viewpoint VP is set to the driver viewpoint, that is diagonally downward and forward, image elements including the front wheels and the front end of own vehicle are cut out as the traveling direction image AP.

In the traveling direction image AP, the cut-out portion on which the real time camera image is projected corresponds to the first traveling direction image AP1. In the traveling direction image AP, the cut-out portion on which the past image is projected corresponds to the second traveling direction image AP2.

The first traveling direction image AP1 is a composite image obtained by synthesizing the camera images captured by three cameras 2, that is, the front camera 2F, the right camera 2R, and the left camera 2L. The second traveling direction image AP2 is a composite image obtained by synthesizing multiple past images captured at different time points. Each past image included in the second traveling direction image AP2 is a camera image obtained by performing correction such as rotation correction on the camera image captured by the front camera 2F.

When the wheel of own vehicle is not in the slip state, the second traveling direction image AP2 is updated with an appropriate past image in accordance with the movement of own vehicle. When the wheel of own vehicle is in the slip state, the past image captured at the position immediately before the start of slip state is maintained as the second traveling direction image AP2, and the past image does not change in the slip state. The first traveling direction image AP1 is always set to an image in which the currently captured camera images are synthesized regardless of whether the wheel is in slip state or in non-slip state.

In S141, the display image generation unit F81 generates the display image DP to include the traveling direction image AP generated by the composite image generation unit F7. After generating the display image DP, the process proceeds to S142.

In S142, the image output unit F9 outputs the display image DP to the display 3. More specifically, the image output unit F9 outputs, to the display 3, a signal obtained by converting the digital image data of the display image DP generated by the display image generation unit F81 into a predetermined signal format. Thus, the display image DP including the traveling direction image AP is displayed on the display 3. After outputting the display image DP, the peripheral image display process is terminated. The process may be repeatedly executed until the display end condition is satisfied, and the latest peripheral image may be continuously displayed.

The following will describe technical effects of the above-described embodiment. In the above-described embodiment, in the non-slip state of vehicle, the display control unit F8 displays the traveling direction image AP to include the transparent image CP using the past image selected based on the current wheel speed. In the slip state, the display control unit F8 displays the traveling direction image AP to include the transparent image CP using the past image immediately before the start of slip state. In other words, in the non-slip state, the display control unit F8 displays the transparent image CP showing the road surface under the floor of the vehicle 9 using the past image selected based on the current wheel speed. In the slip state, the display control unit F8 does not display the transparent image CP using the past image selected based on the current wheel speed. Thus, it is possible to suppress the display of transparent image CP using the camera image at a position significantly different from the actual underfloor position as the past image. Therefore, display of an image that is significantly different from the actual surrounding of the vehicle as the peripheral image can be suppressed in the slip state. Therefore, it is possible to provide a highly reliable peripheral image display device.

The past image update and the slip state determination are performed based on the wheel speed. Therefore, it is easy to reduce the processing load compared with a case where the past image is updated by a method which includes image processing of the camera image, such as the optical flow method. Therefore, it is possible to easily update the past image at high speed and shorten the time lag that occurs in the peripheral image display processing.

In the slip state, the display control unit F8 displays the traveling direction image AP to include the transparent image CP generated by using the past image immediately before the wheel of vehicle starts slipping. In other words, the display control unit F8 displays the transparent image CP displayed immediately before the wheel starts slipping when the wheel is determined to be in the slip state. Therefore, it is easy to reduce the deviation between the transparent image CP and the actual underfloor position compared with a case where the transparent image CP is generated and displayed using the past image selected based on the wheel speed in the slip state.

The traveling direction image AP includes the camera image of front camera 2F, the camera image of left camera 2L, and the camera image of right camera 2R. That is, the display control unit F8 displays the peripheral image synthesized by using the camera image in the traveling direction of the vehicle 9 and the camera image in the left-right direction. Therefore, a wider peripheral range can be displayed by the peripheral image compared with a case where the peripheral image generated by using only the camera image in the traveling direction is displayed.

The wheel slip determination unit F32 determines that the wheel is in the slip state when the difference between the wheel speed of left wheel and the wheel speed of right wheel is equal to or greater than the predetermined slip state wheel speed. Thus, the wheel slip determination unit can determine the wheel slip only based on the wheel speed. Compared with a case where the wheel slip is determined by other devices other than the wheel speed sensor 6s, for example, the wheel slip is determined by an acceleration sensor for detecting the acceleration of the vehicle 9 and a position detection device for detecting a position of the vehicle, the wheel slip determination according to the above embodiment can be made in a simple configuration.

The traveling direction image AP includes the transparent image CP showing the periphery of own vehicle. The transparent image is generated in transparent manner as if the components of the vehicle 9, such as the instrument panel and the underfloor of the vehicle body are transparent. Thus, by confirming such peripheral image, the user can confirm the state of the surrounding of own vehicle from the viewpoint in the vehicle compartment, and can intuitively grasp the state of the surrounding of own vehicle.

The traveling direction image AP includes the vehicle model, such as the vehicle boundary line Lvc and the 3D tire model Pt. Based on the vehicle boundary line Lvc included in the traveling direction image AP, the user can easily recognize a sense of distance from the vehicle body to a three-dimensional object, such as a rock, a curb, or a flap plate existing in the vicinity of the vehicle. Thus, it is possible to reduce the risk of the vehicle body being contact with the three-dimensional object unintentionally. The user can easily recognize the positions of the vehicle body and the tires with respect to the lane markings, curbs, rocks, etc. located under the vehicle body. As a result, during off-road driving, it is possible to perform detailed driving operations, such as placing the tire on a targeted rock. During on-road driving, it is possible to easily perform detailed driving operations, such as moving the vehicle body toward the road edge without contacting the tires with the curb.

The effect of the present embodiment has been described with respect to the example in which the driver viewpoint with the visual line direction directed forward is set as the virtual viewpoint VP. The same effect can be obtained when the visual line direction is directed to other directions such as rearward, laterally, and diagonally laterally. The same effect can be obtained when the virtual viewpoint VP is arranged at an arbitrary position in the vehicle compartment other than the driver viewpoint. The same effect can be expected when the virtual viewpoint VP is set on the outer surface of the vehicle 9 or set at a point positioned outside vicinity of the outer surface of the vehicle. For example, the outside vicinity of the vehicle may refer to a region within 0.2 m from the outer surface of the vehicle 9. The outer surface may include a back surface portion, a front end portion, a roof, and left and right side surface portions. Each side surface portion may include door panels, fenders, pillars, or the like.

The virtual viewpoint VP can be properly set at different positions in the vehicle compartment. For example, the virtual viewpoint VP may be set so that the view point position is set near the side mirror or set in the center of the ceiling in the vehicle compartment, or the like. The display control unit F8 may set the inside viewpoint in the vehicle compartment so that the viewpoint position is set behind the eyellipse and visual line direction is diagonally backward and downward. This inside viewpoint is also referred to as an inside rear viewpoint. According to such inside rear viewpoint, it is possible to display the vicinity of the rear wheels in a larger size as the traveling direction image AP when the vehicle is moving rearward. With this configuration, it becomes easier for the driver to recognize the situation around the rear wheels and the rear bumper while moving rearward.

In the above embodiment, the display 3 is provided by a vehicle mounted display. A device that displays the image generated by the image generation ECU 70 is not limited to the vehicle mounted display. The display 3 may be a display device provided by a mobile terminal, such as a smartphone for remotely controlling the vehicle 9. The display 3 may be a display device provided in a management center that manages the vehicle 9 by remote control.

Second Embodiment

The second embodiment is a modification of the above-described first embodiment. In this embodiment, the traveling direction image AP includes, instead of the transparent image CP, the non-transparent image BP which is generated by gradually lowering the transparency of the slip state image displayed in superimposed manner on the past image.

Figure 8:
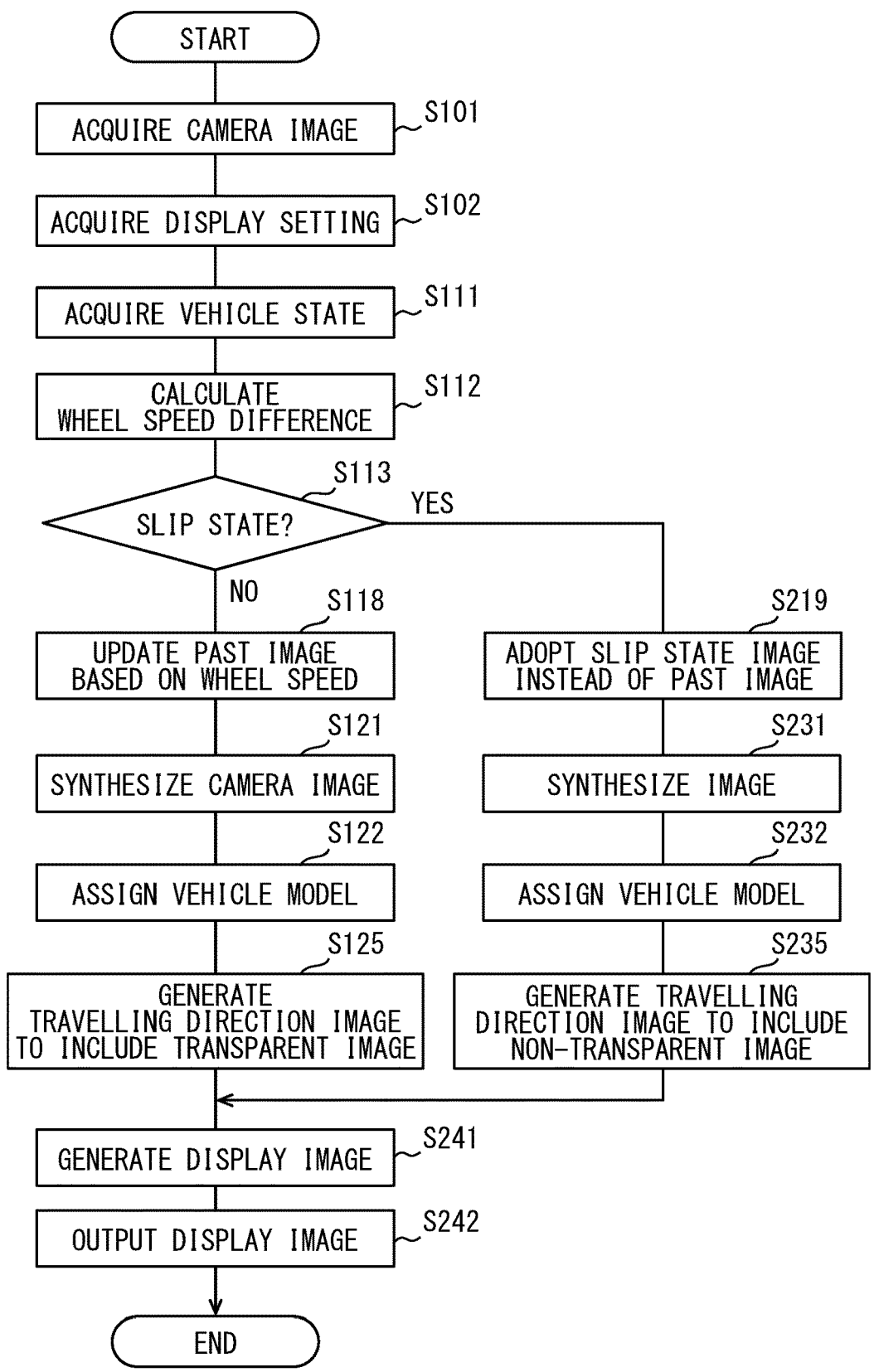
FIG. 8 is a flowchart showing a control process executed by a peripheral image display system according to a second embodiment.

The following will describe a peripheral image display process with reference to the flowchart shown in FIG. 8. In the following description, same part as the first embodiment may be omitted. The image generation ECU 70 starts the peripheral image display process in response to the peripheral image display condition being satisfied. When the wheel slip determination unit F32 determines in S113 that the vehicle is in the non-slip state (S113: NO), the process proceeds to S118. When the wheel slip determination unit F32 determines in S113 that the vehicle is in the slip state (S113: YES), the process proceeds to S219.

In S118, the composite image generation unit F7 updates the past image based on the wheel speed. Then, the process proceeds to S121, and the camera image composition unit F71 synthesizes the camera image. Then, the process proceeds to S122, and the vehicle model assign unit F72 assigns the vehicle model to the composite image. Then, the process proceeds to S125, and the composite image generation unit F7 generates the traveling direction image AP to include the transparent image CP. Then, the process proceeds to S241.

In S219, the composite image generation unit F7 adopts the slip state image instead of the past image. The slip state image is an image to be displayed when the wheel is in the slip state. The slip state image may be properly set under a condition that the image does not mislead the user that the current underfloor is displayed. As the slip state image, an image of a single color, such as black or white can be adopted. As the slip state image, an image indicating that the vehicle is in the slip state with character message may be adopted. The slip state image may be set with a color different from the color of the road surface or the color of the vehicle model. After adopting the slip state image instead of the past image, the process proceeds to S231.

In S231, the composite image generation unit F7 synthesizes an image using the camera image and the slip state image. More specifically, the image data of each camera 2 and the slip state image are mapped to the predetermined positions on the projection surface TS. The slip state image is projected on the vehicle area. Thus, the slip state image is combined with the portion corresponding to the underfloor of the vehicle. After synthesizing the images, the process proceeds to S232.

In S232, the vehicle model assign unit F72 assigns the vehicle model, such as the vehicle boundary line Lvc or the 3D tire model Pt to the composite image. After assigning the vehicle model, the process proceeds to S235.

In S235, the composite image generation unit F7 generates the traveling direction image AP to include the non-transparent image BP. The non-transparent image BP is an image different from the transparent image CP. The non-transparent image BP does not show the road surface under the underfloor of the vehicle in a transparent manner as the transparent image CP. Thus, it is possible to avoid a misunderstanding of the transparent image CP by the user. The composite image generation unit F7 performs rendering to the composite image after the vehicle model is assigned according to the virtual viewpoint VP. The composite image generation unit F7 generates the traveling direction image AP to include the non-transparent image BP by cutting out an image element included in the predetermined view angle when viewed from the virtual viewpoint VP.

Figure 9:
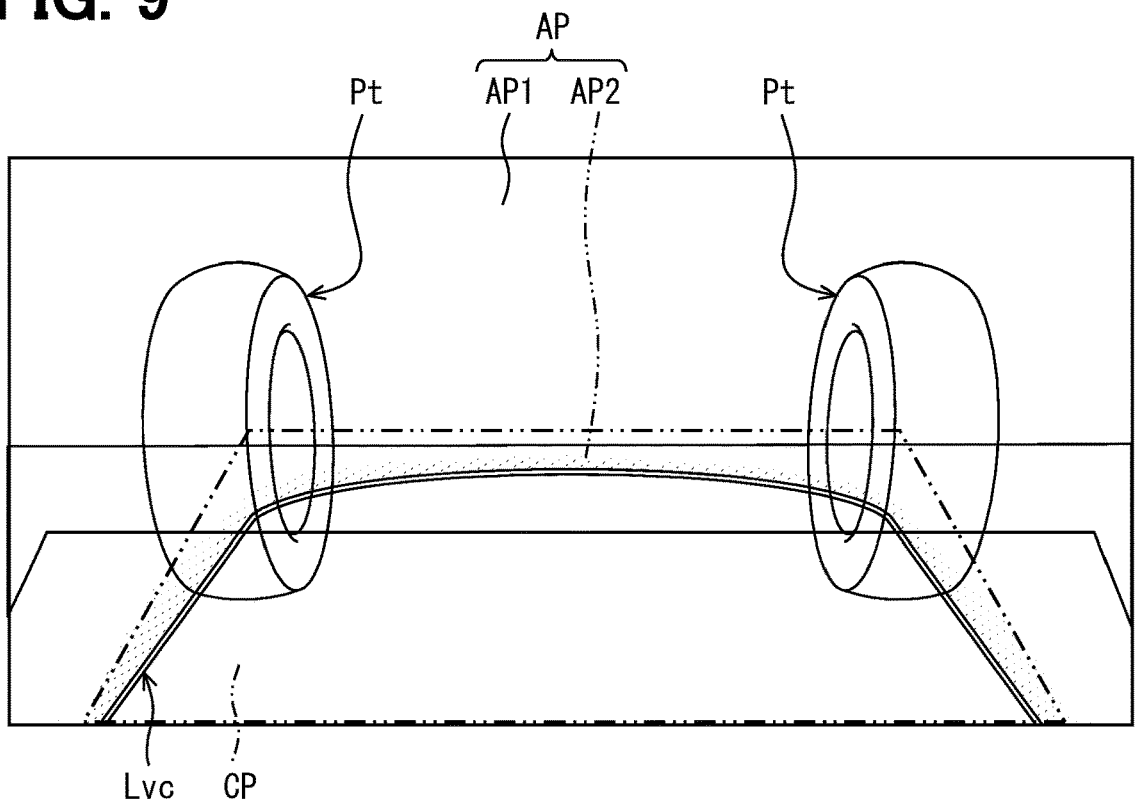
FIG. 9 is a diagram showing a traveling direction image that includes a transparent image according to the second embodiment.

The following will describe a method of generating the traveling direction image AP when the transparent image CP is switched to the non-transparent image BP to generate the traveling direction image AP as an example. In FIG. 9, the first traveling direction image AP1 is an image obtained by synthesizing the current camera images captured by the front camera 2F, the right camera 2R, and the left camera 2L. The second traveling direction image AP2 is a past image captured by the front camera 2F. In this state, each of the first traveling direction image AP1 and the second traveling direction image AP2 includes the white line indicating the parking frame.

Figure 10:
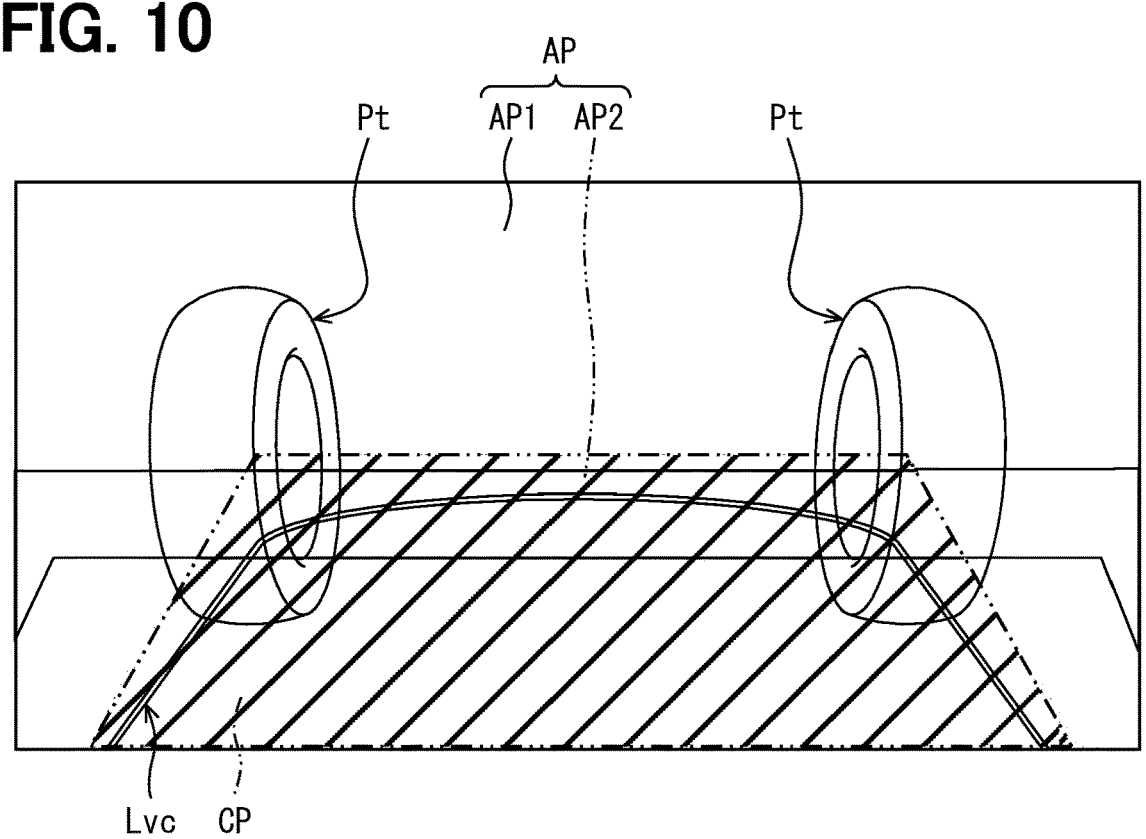
FIG. 10 is a diagram showing a traveling direction image in a changing state from the transparent image to a non-transparent image according to the second embodiment.

In FIG. 10, the second traveling direction image AP2 is generated by synthesizing the past image and the slip state image. More specifically, the second traveling direction image AP2 is generated by superimposing the slip state image having increased transparency on the past image immediately before the slip state. In other words, the second traveling direction image AP2 is generated by superimposing semi-transparent image in the slip state on the past image immediately before the slip state. In FIG. 10, hatching with large pitches are applied to the past image immediately before the slip state in order to show that the second traveling direction image AP2 is generated by superimposing semi-transparent image in the slip state on the past image immediately before the slip state.

When the slip state image is a black image, the past image is displayed in transparent manner by black color. Thus, the user is difficult to visually recognize the past image immediately before the slip state. When the slip state image is the character image indicating the slip state of vehicle, the character indicating the slip state may be light-colored and the slip state image is superimposed on the past image immediately before the slip state. In the above examples, since the transparent image showing the road surface under the vehicle is displayed, the white line of the parking frame is included in the second traveling direction image AP2.

Figure 11:
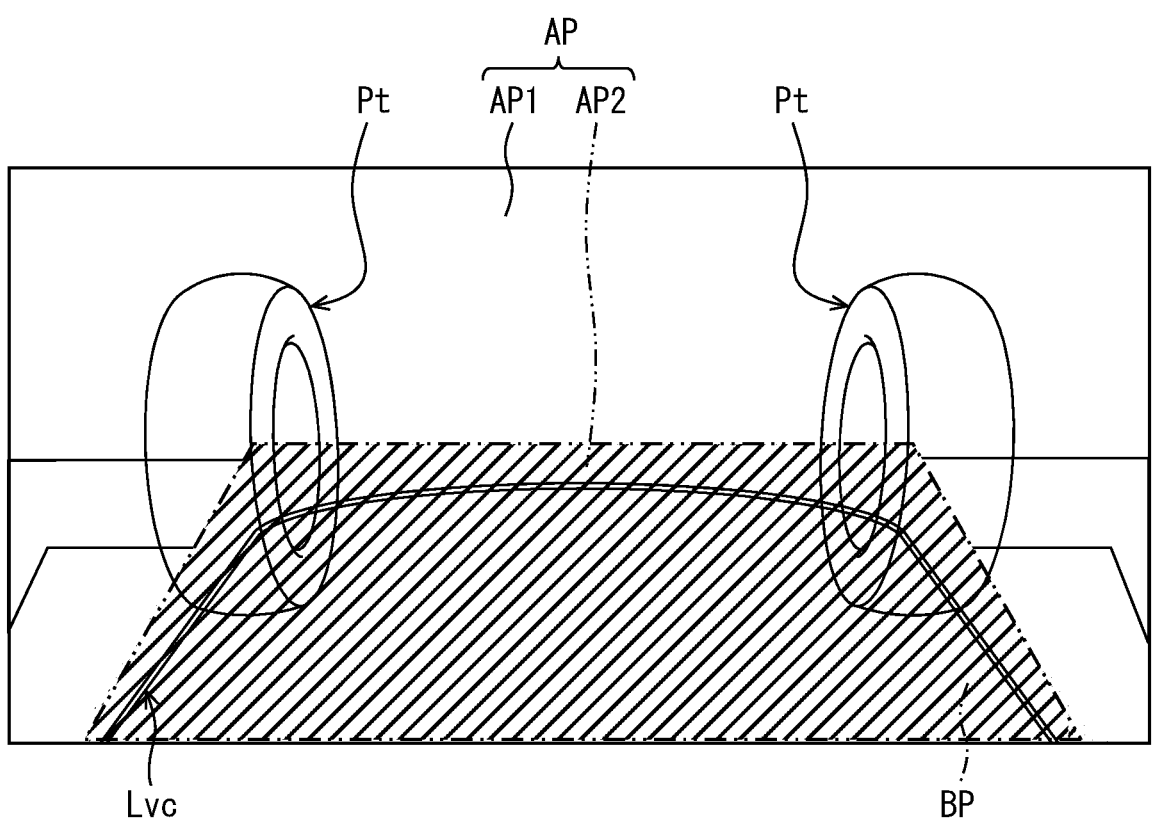
FIG. 11 is another diagram showing a traveling direction image that includes the non-transparent image according to the second embodiment.

In FIG. 11, the second traveling direction image AP2 includes only the slip state image provided by the non-transparent image BP. In FIG. 11, hatching with smaller pitches compared with FIG. 10 is applied in order to show that the second traveling direction image AP2 includes only the slip state image. When the slip state image is a black image, the entire second traveling direction image AP2 becomes black, and the past image immediately before the slip state cannot be visually recognized by the user. When the slip state image is the character image indicating the slip state, only the character indicating slip state can be visually recognized by the user, and the past image immediately before the slip state cannot be visually recognized by the user.

Since the slip state image is not an image showing, in transparent manner, the road surface under the vehicle, the white line of the parking frame is not included in the second traveling direction image AP2. However, when the current camera image is combined and displayed in the first traveling direction image AP1, the white line of the parking frame is included in the first traveling direction image. The user can confirm the peripheral image other than under the vehicle floor by confirming the first traveling direction image AP1. The user can recognize that the wheel is in the slip state by confirming that the slip state image is displayed instead of the underfloor image in the second traveling direction image AP2.

When generating the traveling direction image AP to include the non-transparent image BP, as shown in the order of FIG. 9, FIG. 10, and FIG. 11, the image including only the past image is gradually switched to the image including only the slip state image by image processing. More specifically, the transparency of the slip state image is continuously reduced from 100% to zero. After generating the traveling direction image AP to include the non-transparent image BP, the process proceeds to S241.

In S241, the display image generation unit F81 generates the display image DP to include the traveling direction image AP generated by the composite image generation unit F7. During the non-slip state, the display image DP is generated to include the transparent image CP. During the slip state, the display image DP is generated to include the non-transparent image BP. Immediately after the wheel enters from the non-slip state to the slip state, the display image DP is generated to include the transparent image CP in which the semi-transparent slip state image is superimposed on the past image immediately before the slip state. After generating the display image DP, the process proceeds to S242.

In S242, the image output unit F9 outputs the display image DP to the display 3. In the non-slip state, the display 3 displays the display image DP including the transparent image CP. In the slip state, the display 3 displays the display image DP including the non-transparent image BP. Immediately after the wheel enters from the non-slip state to the slip state, the display 3 displays the display image DP is which is generated to include the transparent image CP in which the semi-transparent slip state image is superimposed on the past image immediately before the slip state. After outputting the display image DP, the peripheral image display process is terminated. The process may be repeatedly executed until the display end condition is satisfied, and the latest peripheral image may be continuously displayed.

The following will describe technical effects of the present embodiment. According to the present embodiment, the display control unit F8 displays the non-transparent image BP that shows the road surface under the vehicle floor portion in opaque manner, that is, non-transparent manner in the slip state. Therefore, it is possible to prevent the user from misunderstanding the situation under the vehicle floor in the slip state.

In the non-slip state, the transparent image CP is displayed. In the slip state, the non-transparent image BP is displayed. Thus, by recognizing whether the transparent image CP is displayed or the non-transparent image BP is displayed, the user can recognize whether the vehicle is in the slip state or in the non-slip state.

When the display control unit F8 switches the transparent image CP displayed in the non-slip state to the non-transparent image BP displayed in the slip state, the transparency is gradually lowered to display the non-transparent image BP. Therefore, the user can visually recognize the display switching effect as the display effect associated with the image switching. Thus, when switching from the transparent image CP to the non-transparent image BP, it is possible to prevent the user from misunderstanding that the display 3 or the like is out of order.

The method of displaying the traveling direction image AP which includes the non-transparent image BP is not limited to the above method. For example, the non-transparent image BP may be displayed instead of the transparent image CP by superimposing the past image on the slip state image and increasing the transparency of the past image in stepwise manner.

Third Embodiment

The third embodiment is a modification of the above-described embodiments. In the present embodiment, the traveling direction image AP including the non-transparent image BP instead of the transparent image CP is displayed by gradually widening the area where the non-transparent image BP is displayed in the slip state.

Figure 12:
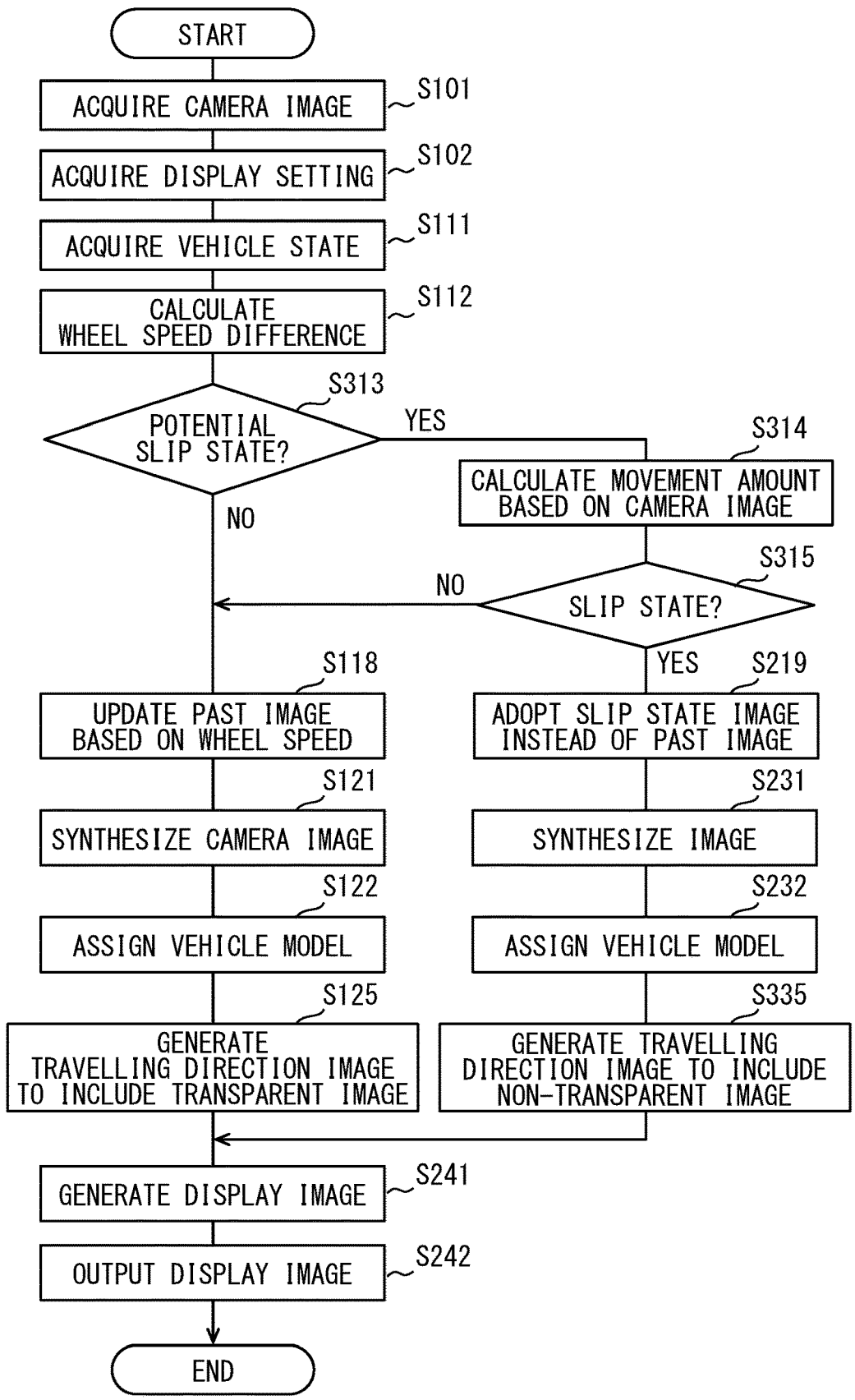
FIG. 12 is a flowchart showing a control process executed by a peripheral image display system according to a third embodiment.

The following will describe a peripheral image display process with reference to the flowchart shown in FIG. 12. In the following description, same part as the first embodiment may be omitted. The image generation ECU 70 starts the peripheral image display process in response to the peripheral image display condition being satisfied. The camera image is acquired in S101. Then, the process proceeds to S102 and acquires the display settings. Then, the process proceeds to S111 and acquires the vehicle state. Then, the process proceeds to S112, and the wheel speed difference is calculated. Then, the process proceeds to S313.

In S313, the wheel slip determination unit F32 determines a possibility of wheel slip based on the wheel speed. The wheel slip determination unit F32 may determine that the front wheel of own vehicle may be in the slip state when the difference between the wheel speed of right front wheel and the wheel speed of left front wheel is larger than a predetermined non-slip state wheel speed. The non-slip state wheel speed is set to a value lower than the slip state wheel speed.

When the wheel speed difference is equal to or lower than the non-slip state wheel speed, the wheel is determined to be in the non-slip state. When the wheel speed difference is larger than the non-slip state wheel speed and lower than the slip state wheel speed, the wheel may be in the slip state or in the non-slip state. That is, when the wheel speed difference is larger than the non-slip state wheel speed and lower than the slip state wheel speed, it is determined that the possibility of wheel slip exists. When the wheel speed difference is greater than or equal to the slip state wheel speed, it is highly possible that the wheel is in the slip state. When the possibility of wheel slip exists, that is the vehicle is in a potential slip state (S313: YES), the process proceeds to S314. When there is no possibility of wheel slip (S313: NO), the vehicle is determined to be in the non-slip state, and the process proceeds to S118.

In S314, the image recognition unit F5 calculates the amount of movement of the vehicle 9 based on the camera image. The amount of movement of the vehicle 9 can be calculated by using image processing, such as the optical flow method. When the amount of movement of the vehicle 9 is calculated based on the camera image, the amount of movement of the vehicle 9 is substantially zero even when the wheels rotate in the slip state, and the amount of movement of the vehicle 9 increases according to the rotation of the wheels in the non-slip state. After calculating the movement amount of the vehicle 9 based on the camera image, the process proceeds to S315.

In S315, the wheel slip determination unit F32 determines whether the wheel of own vehicle is in the slip state. More specifically, when the movement amount of the vehicle 9 is substantially zero, the vehicle is determined to be in the slip state. When the movement amount of the vehicle 9 is equivalent to the movement amount calculated based on the wheel speed, the vehicle is determined to be in the non-slip state. When the vehicle is determined to be in the slip state (S315: YES), the process proceeds to S219. When the vehicle is determined to be in the non-slip state (S315: NO), the process proceeds to S118.

In S219, the composite image generation unit F7 adopts the slip state image instead of the past image. Then, the process proceeds to S231, and the camera image and the slip state image are synthesized as the composite image. Then, the process proceeds to S232, and the vehicle model is assigned to the composite image. Then, the process proceeds to S335.

In S335, the composite image generation unit F7 generates the traveling direction image AP to include the non-transparent image BP. The following will describe a method of generating the traveling direction image AP when the transparent image CP is switched to the non-transparent image BP to generate the traveling direction image AP as an example.

Figure 13:
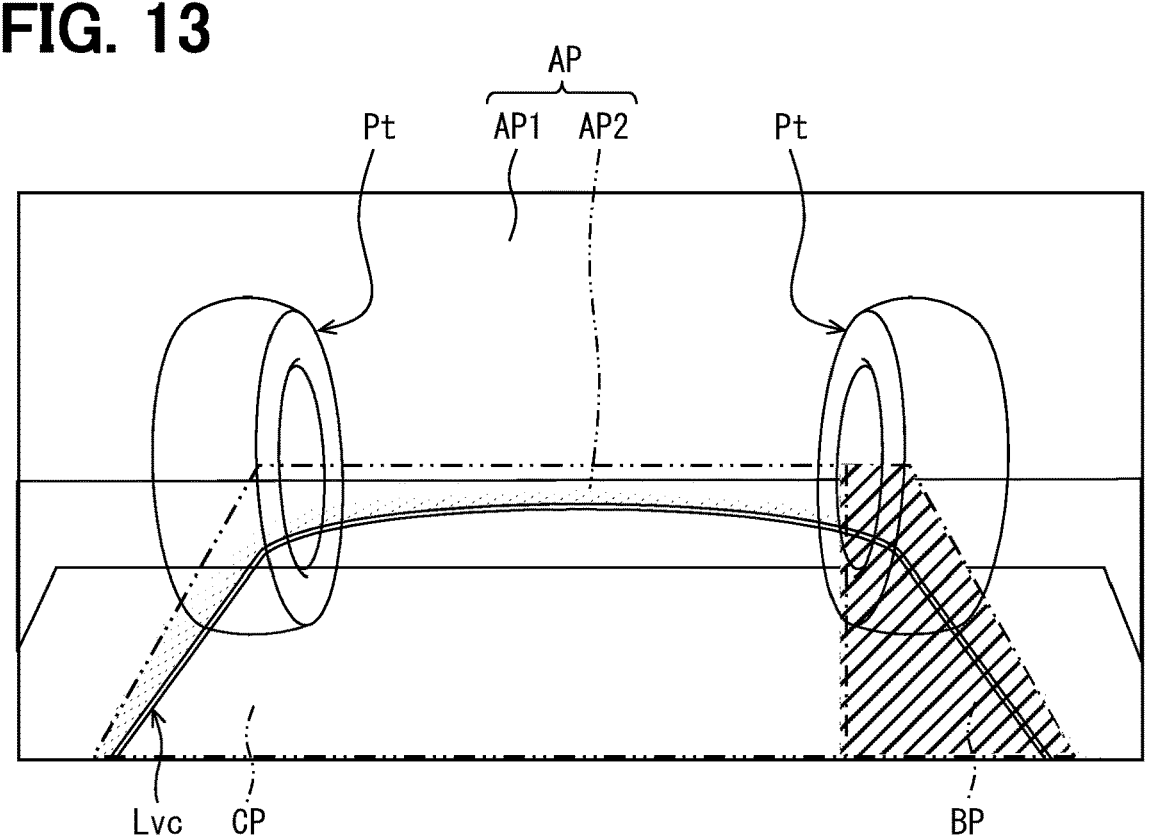
FIG. 13 is a diagram showing a traveling direction image in a changing state from the transparent image to a non-transparent image according to the third embodiment.

In FIG. 13, the first traveling direction image AP1 is an image obtained by synthesizing the current camera images captured by the front camera 2F, the right camera 2R, and the left camera 2L. The second traveling direction image AP2 is an image including both of the transparent image CP, which is the past image captured by the front camera 2F, and the non-transparent image BP, which is the slip state image. The transparent image CP is maintained on the left and central portions of the second traveling direction image AP2, and the non-transparent image BP is adopted on the right portion of the second traveling direction image AP2. That is, the non-transparent image BP is adopted as a part of the second traveling direction image AP2. In FIG. 13, the second traveling direction image AP2 is displayed in a state where the region of transparent image CP is wider than the region of non-transparent image BP.

Figure 14:
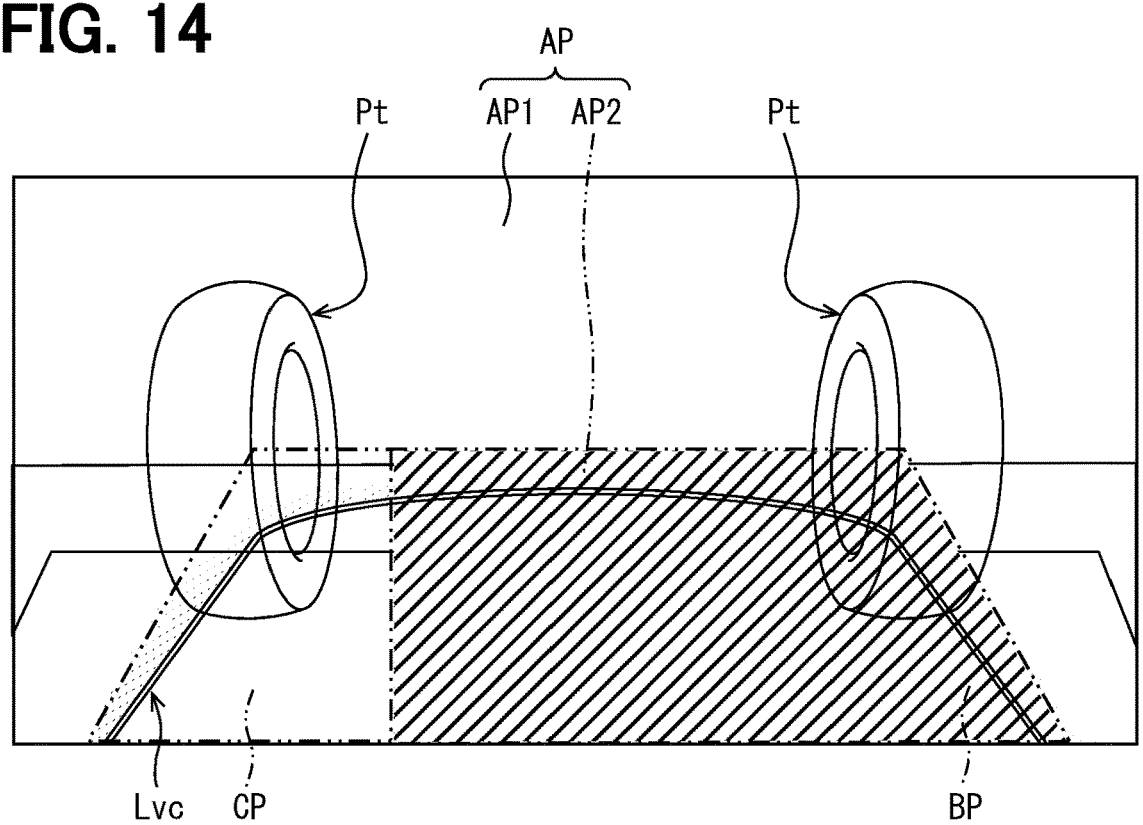
FIG. 14 is another diagram showing a traveling direction image in the changing state from the transparent image to the non-transparent image according to the third embodiment.

As shown in FIG. 14, the second traveling direction image AP2 includes both of the transparent image CP, which is the past image captured by the front camera 2F, and the non-transparent image BP, which is the slip state image. The transparent image CP is maintained on the left portion of the second traveling direction image AP2, and the non-transparent image BP is adopted on the right and central portions of the second traveling direction image AP2. In FIG. 14, the second traveling direction image AP2 is displayed in a state where the region of non-transparent image BP is wider than the region of transparent image CP.

When generating the traveling direction image AP to include the non-transparent image BP, as shown in the order of FIG. 9, FIG. 13, and FIG. 14, the image including only the past image is gradually switched to the image including only the slip state image by image processing. More specifically, the region of transparent image CP in the second traveling direction image AP2 is gradually decreased, and the region of non-transparent image BP is gradually increased. The non-transparent image BP is not limited to the mode of expanding from the right end to the left end of the second traveling direction image AP2 as described in the above example. For example, the region of non-transparent image BP may be increased from the left end to the right end in the second traveling direction image AP2. For example, the region of non-transparent image BP may be increased from the upper end to the lower end in the second traveling direction image AP2. For example, the region of non-transparent image BP may be increased from the central portion toward the outer peripheral edge in the second traveling direction image AP2.

After generating the traveling direction image AP to include the non-transparent image BP, the process proceeds to S241 to generate the display image DP. Then, the process proceeds to S242, and the display image DP is output. After outputting the display image DP, the peripheral image display process is terminated. The peripheral image display process may be repeatedly executed until the display end condition is satisfied, and the latest peripheral image may be continuously displayed.

The following will describe technical effects of the present embodiment. According to the above-described embodiment, the display control unit F8 displays the non-transparent image BP by gradually widening the region of non-transparent image BP when switching the transparent image CP to the non-transparent image BP. Thus, when switching from the transparent image CP to the non-transparent image BP, it is possible to prevent the user from misunderstanding that the display 3 or the like is out of order.

When the wheel slip determination unit F32 determines that the wheel is in the potential slip state based on the wheel speed, the wheel slip determination unit F32 further determines whether the wheel is in the slip state based on the camera image captured over time. Therefore, it is possible to make a highly accurate slip state determination using the camera image. When the vehicle is determined to be not in the potential slip state based on the wheel speed, the slip state determination using the camera image is not performed. The slip state determination using the camera image requires a larger processing load than the slip state determination based on the wheel speed. Therefore, the processing load required for the slip state determination can be reduced compared with a case where the slip state determination is always performed using the camera images. Thus, it is easy to reduce the processing load for the slip state determination and output of the peripheral image, and the processing duration can be shortened.

Other Embodiments

The disclosure in this specification and drawings is not limited to the exemplified embodiments. The present disclosure includes embodiments described above and modifications of the above-described embodiments made by a person skilled in the art. For example, the present disclosure is not limited to a combination of the components and/or elements described in the embodiments. The present disclosure may be executed by various different combinations. The present disclosure may include additional configuration that can be added to the above-described embodiments. The present disclosure also includes modifications which include partial components/elements of the above-described embodiments. The present disclosure also includes replacement or combination of components and/or elements between one embodiment and another. The technical scope disclosed in the present disclosure is not limited to the above-described embodiments. It should be understood that some disclosed technical ranges are indicated by description of claims, and includes every modification within the equivalent meaning and the scope of description of claims.

The disclosure in the specification, drawings and the like is not limited by the description of the claims. The disclosures in the specification, the drawings, and the like includes the technical ideas described in the claims, and further extend to a wider variety of technical ideas than those described in the claims. Thus, various technical ideas can be extracted from the disclosure of the specification, the drawings and the like without being limited to the description of the present disclosure.

The image generation unit and method thereof according to the present disclosure may be implemented by one or more special-purposed computers. Such a special-purposed computer may be provided (i) by configuring (a) a processor and a memory programmed to execute one or more functions embodied by a computer program, or (ii) by configuring (b) a processor including one or more dedicated hardware logic circuits, or (iii) by configuring by a combination of (a) a processor and a memory programmed to execute one or more functions embodied by a computer program and (b) a processor including one or more dedicated hardware logic circuits. The technique for realizing the functions of each functional unit included in the apparatus or the method thereof does not necessarily need to include software, and all the functions may be realized using one or more hardware circuits. Further, the computer program may be stored, as a program product, in a computer-readable non-transitory tangible storage medium as instructions to be executed by a computer.

What is claimed is:

1. A peripheral image display device comprising:
a wheel speed acquisition unit acquiring wheel speeds of a vehicle;
a wheel slip determination unit determining a slip state or a non-slip state of a wheel of the vehicle based on the wheel speeds acquired by the wheel speed acquisition unit;
an image acquisition unit acquiring multiple camera images from respective cameras, each of the cameras successively capturing a peripheral range of the vehicle;
an image storage storing, as a past image, the camera image indicating a range in a traveling direction of the vehicle among the camera images acquired by the image acquisition unit;
a composite image generation unit generating a peripheral image indicating a periphery of the vehicle by synthesizing the camera images acquired by the image acquisition unit; and
a display control unit displaying the peripheral image generated by the composite image generation unit on a display,
wherein,
in the non-slip state, the display control unit displays a transparent image showing, in a transparent manner, a portion under a floor of the vehicle using the past image selected based on current wheel speeds, and,
in the slip state, the display control unit deactivates a display of the transparent image, which shows the portion under the floor of the vehicle using the past image selected based on the current wheel speeds.

2. The peripheral image display device according to claim 1, wherein,
in the slip state, the display control unit displays a non-transparent image that does not show the portion under the floor of the vehicle in the transparent manner.

3. The peripheral image display device according to claim 2, wherein,
when the display control unit switches the transparent image displayed in the non-slip state to the non-transparent image displayed in the slip state, the display control unit gradually changes a transparency to display the non-transparent image.

4. The peripheral image display device according to claim 2, wherein,
when the display control unit switches the transparent image displayed in the non-slip state to the non-transparent image displayed in the slip state, the display control unit gradually increases a region of the non-transparent image to display the non-transparent image.

5. The peripheral image display device according to claim 1, wherein,
in the slip state, the display control unit displays the transparent image displayed immediately before the wheel of vehicle enters the slip state.

6. The peripheral image display device according to claim 1, wherein
the image acquisition unit acquires the camera image in the traveling direction of the vehicle and the camera images in left and right directions of the vehicle, and
the display control unit displays the peripheral image that is generated by using the camera image in the traveling direction of the vehicle and the camera images in the left and right directions of the vehicle.

7. The peripheral image display device according to claim 1, wherein
the wheel speed acquisition unit acquires, as the wheel speeds, a wheel speed of a right wheel and a wheel speed of a left wheel, and the wheel slip determination unit determines the slip state of the wheel when a difference between the wheel speed of the right wheel and the wheel speed of the left wheel is equal to or greater than a predetermined slip state wheel speed.

8. The peripheral image display device according to claim 1, wherein,
in response to determining that there is no possibility of wheel slip based on the wheel speeds, the wheel slip determination unit determines that the wheel of the vehicle is in the non-slip state, and
in response to determining that there is a possibility of wheel slip based on the wheel speeds, the wheel slip determination unit further determines, based on over-time change of the camera images, whether the wheel of vehicle is in the slip state or in the non-slip state.

9. A peripheral image display device comprising:
a computer-readable non-transitory tangible storage medium; and
a processor, by executing a program stored in the computer-readable non-transitory tangible storage, configured to:
acquire wheel speeds of a vehicle;
determine a slip state or a non-slip state of a wheel of the vehicle based on the acquired wheel speeds;
acquire multiple camera images from respective cameras, each of the cameras successively capturing a peripheral range of the vehicle;
storing, as a past image, the camera image indicating a range in a traveling direction of the vehicle;
generating a peripheral image indicating a periphery of the vehicle by synthesizing the camera images; and
display the generated peripheral image on a display, wherein,
in the non-slip state, the processor displays a transparent image showing, in a transparent manner, a portion under a floor of the vehicle using the past image selected based on current wheel speeds, and,
in the slip state, the processor deactivates a display of the transparent image, which shows the portion under the floor of the vehicle using the past image selected based on the current wheel speeds.

* * * * *